(12) United States Patent
Thomas

(10) Patent No.: US 6,669,229 B2
(45) Date of Patent: Dec. 30, 2003

(54) AUTOMOTIVE VEHICLE AIR BAG SYSTEM

(75) Inventor: Scott David Thomas, Novi, MI (US)

(73) Assignee: General Motors Corporation, Detroit, MI (US)

( * ) Notice: Subject to any disclaimer, the term of this patent is extended or adjusted under 35 U.S.C. 154(b) by 118 days.

(21) Appl. No.: 09/813,397

(22) Filed: Mar. 22, 2001

(65) Prior Publication Data

US 2002/0135164 A1 Sep. 26, 2002

(51) Int. Cl.$^7$ ................................................. B60R 21/16
(52) U.S. Cl. .................... 280/732; 280/740; 280/742; 280/743.1
(58) Field of Search ................................ 280/740, 742, 280/743.1, 732, 736, 729

(56) References Cited

U.S. PATENT DOCUMENTS

| | | | | | |
|---|---|---|---|---|---|
| 3,586,347 A | * | 6/1971 | Carey et al. | ................ | 280/729 |
| 3,788,665 A | * | 1/1974 | Noll et al. | ................ | 280/729 |
| 3,843,150 A | * | 10/1974 | Harada et al. | ................ | 280/729 |
| 5,018,762 A | * | 5/1991 | Suzuki et al. | ................ | 280/742 |
| 5,366,241 A | * | 11/1994 | Kithil | ................ | 280/736 |
| 5,560,648 A | * | 10/1996 | Rhule et al. | ................ | 280/731 |
| 5,570,900 A | * | 11/1996 | Brown | ................ | 280/729 |
| 5,577,765 A | * | 11/1996 | Takeda et al. | ................ | 280/729 |
| 5,588,674 A | * | 12/1996 | Yoshimura et al. | ........ | 280/732 |
| 5,630,614 A | * | 5/1997 | Conlee et al. | ................ | 280/732 |
| 5,823,566 A | * | 10/1998 | Manire | ................ | 280/743.1 |
| 6,053,530 A | | 4/2000 | Faigle | ................ | 280/735 |
| 6,082,759 A | | 7/2000 | Faigle et al. | ................ | 280/728.3 |
| 6,089,599 A | | 7/2000 | Schimmoller et al. | ...... | 280/740 |
| 6,113,134 A | * | 9/2000 | Lim | ................ | 280/742 |
| 6,131,944 A | * | 10/2000 | Henkel et al. | ................ | 280/732 |
| 6,254,121 B1 | * | 7/2001 | Fowler et al. | ................ | 280/729 |
| 6,340,174 B1 | * | 1/2002 | Takagi et al. | ................ | 280/740 |
| 6,361,067 B1 | * | 3/2002 | Varcus et al. | ................ | 280/740 |
| 6,471,244 B1 | * | 10/2002 | Nishijima et al. | ......... | 280/742 |
| 6,536,799 B2 | * | 3/2003 | Sinnhuber et al. | ......... | 280/735 |

* cited by examiner

*Primary Examiner*—Paul N. Dickson
*Assistant Examiner*—Toan C To
(74) *Attorney, Agent, or Firm*—Laura C. Hargitt

(57) ABSTRACT

There is disclosed an air bag system for an automotive vehicle. The air bag system may include one or more of the following: a baffling system, a gas emission direction system, a deployment door guidance system, or a material flap guidance system.

14 Claims, 32 Drawing Sheets

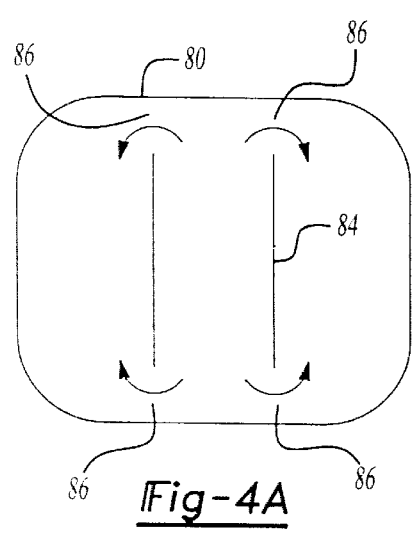
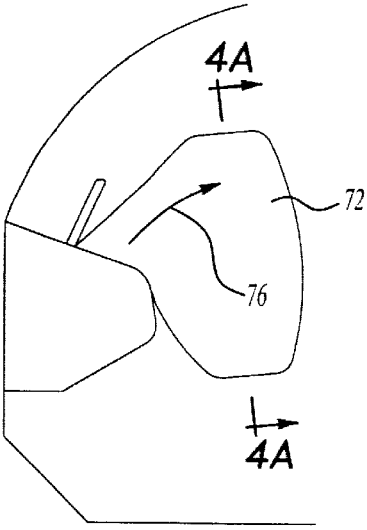
Fig-4
Fig-4A
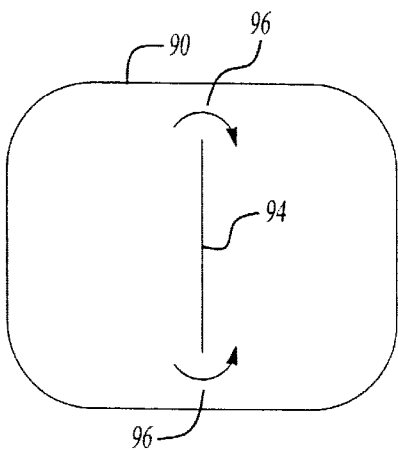
Fig-4B
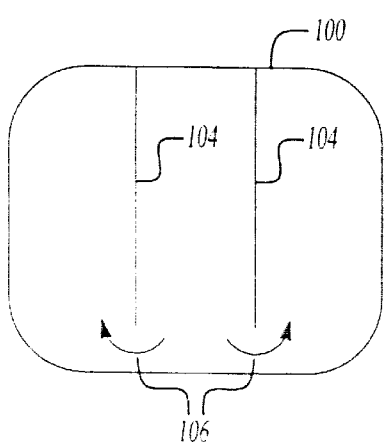
Fig-4C
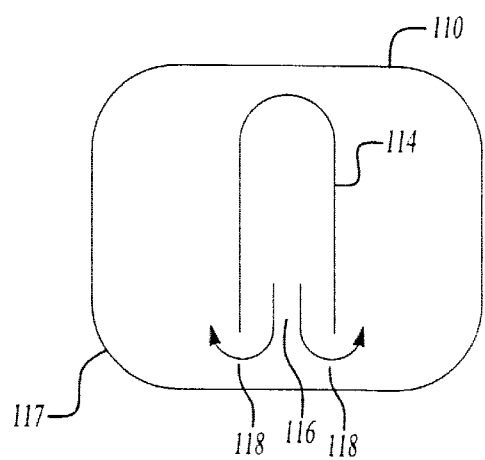
Fig-4D

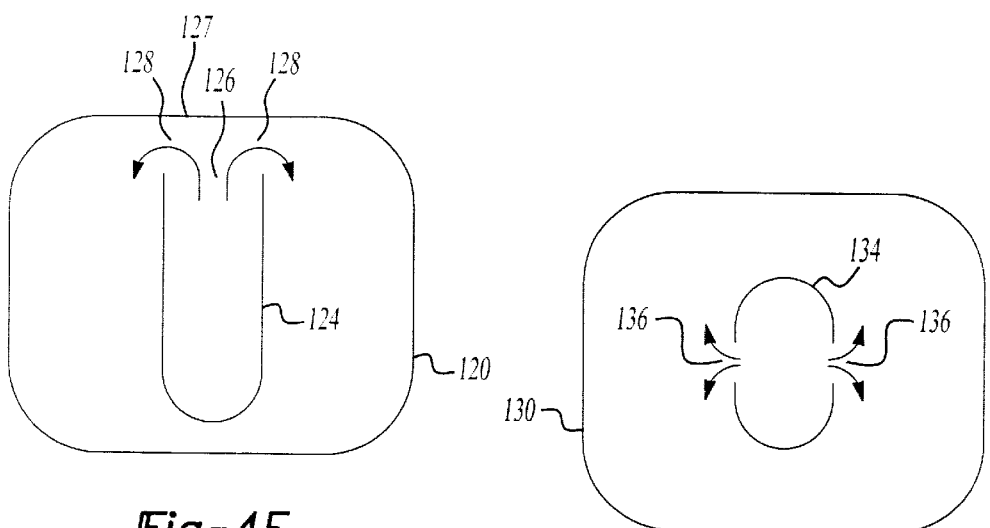
Fig-4E
Fig-4F
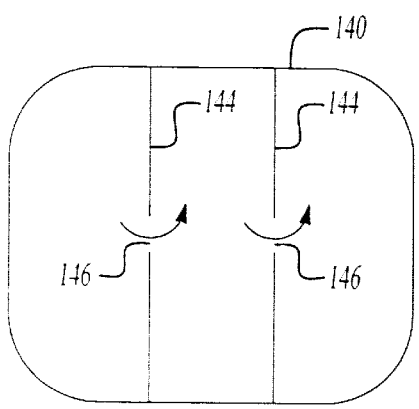
Fig-4G
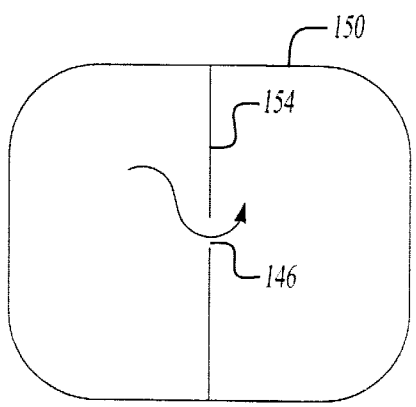
Fig-4H
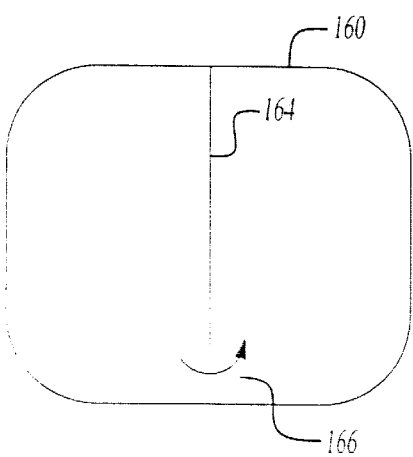
Fig-4I
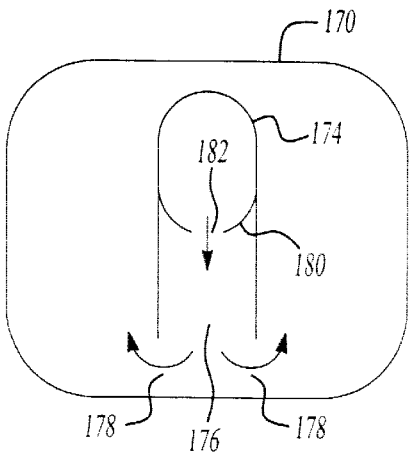
Fig-4J

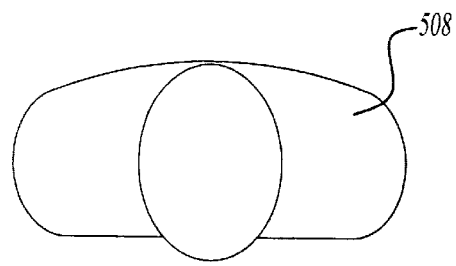
*Fig-13D*
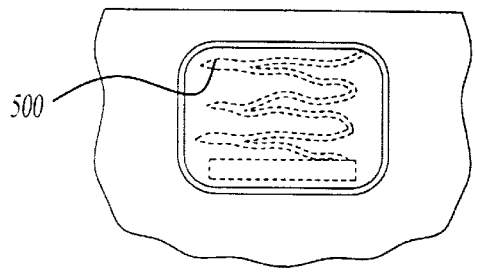
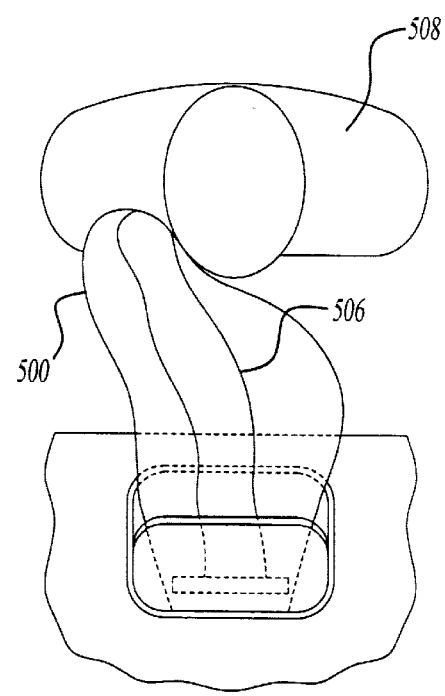
*Fig-13E*
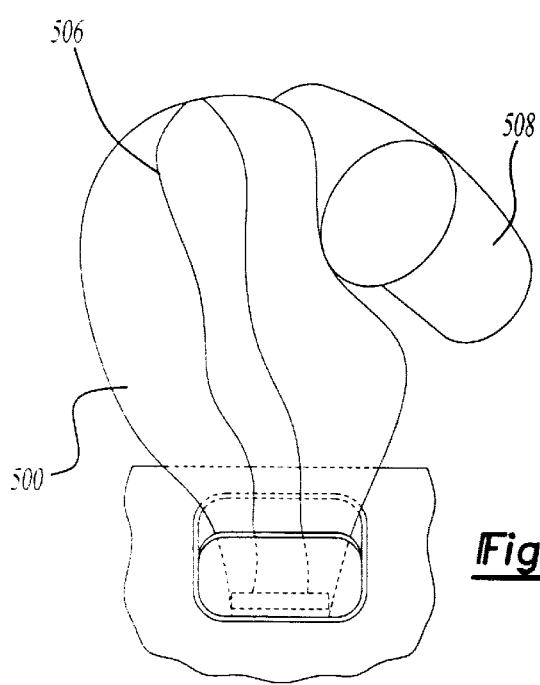
*Fig-13F*

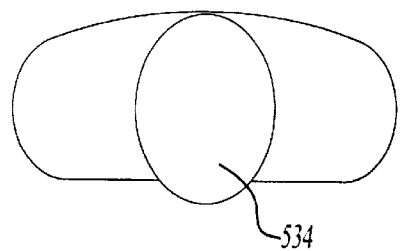
*Fig-14D*
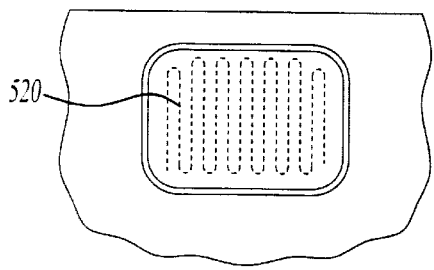
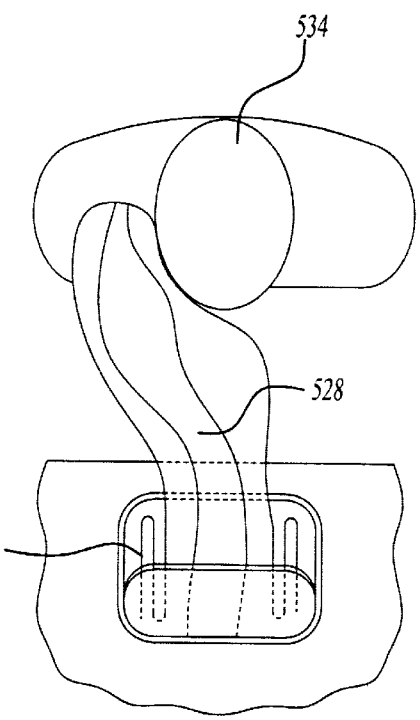
*Fig-14E*
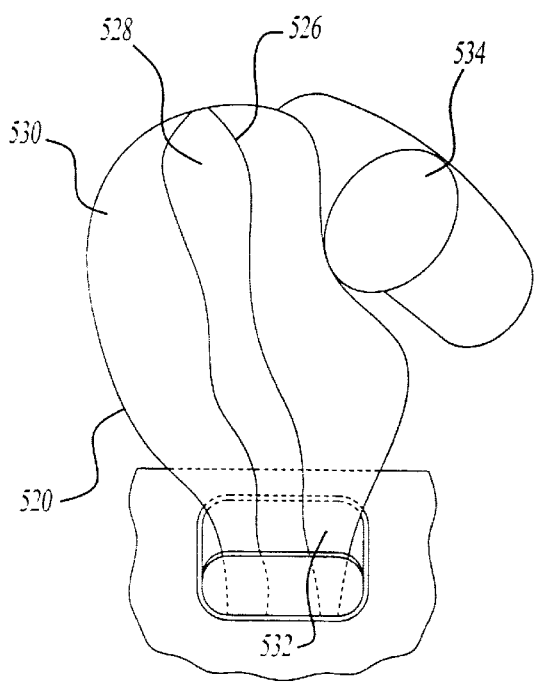
*Fig-14F*
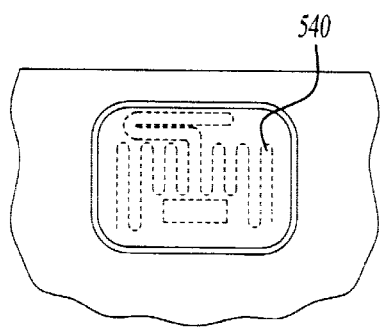
*Fig-15*

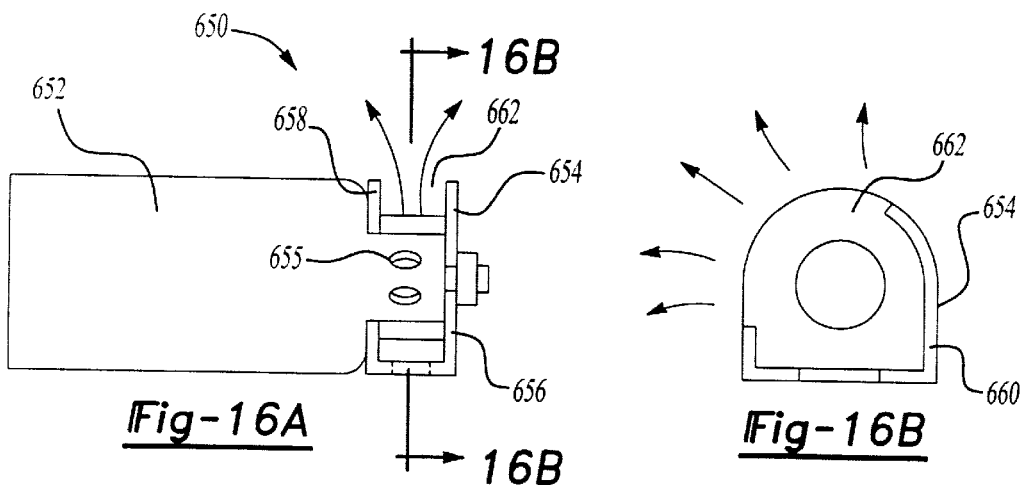
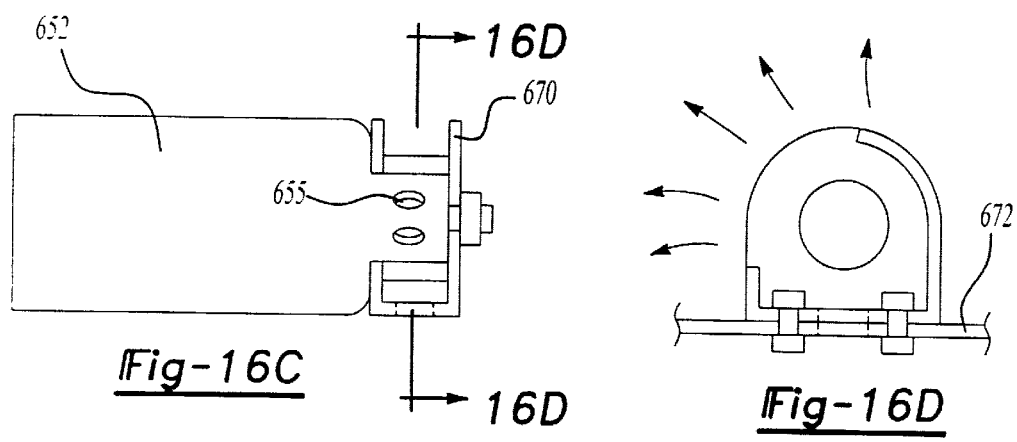
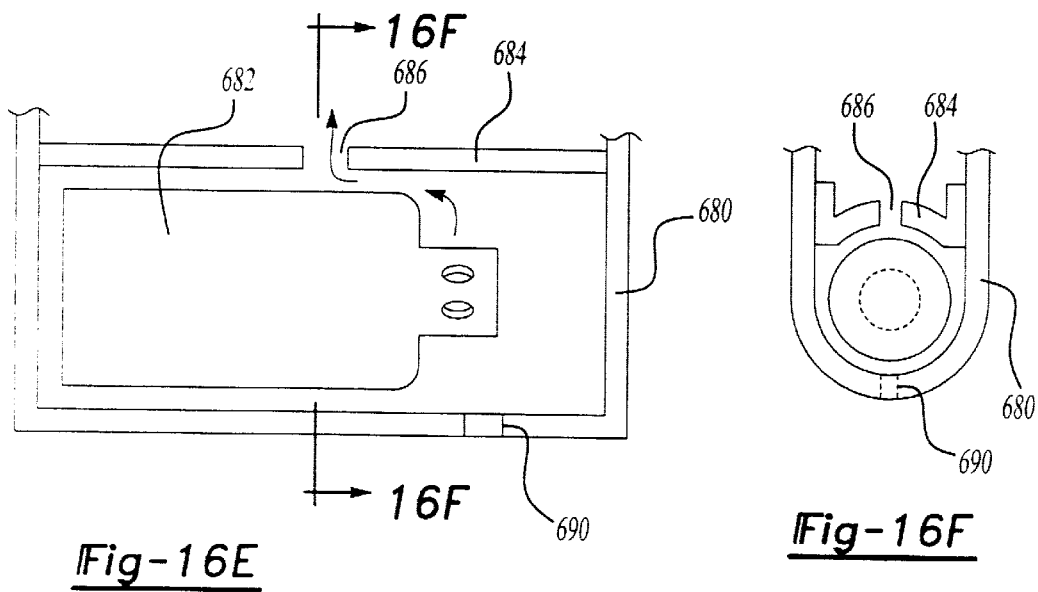

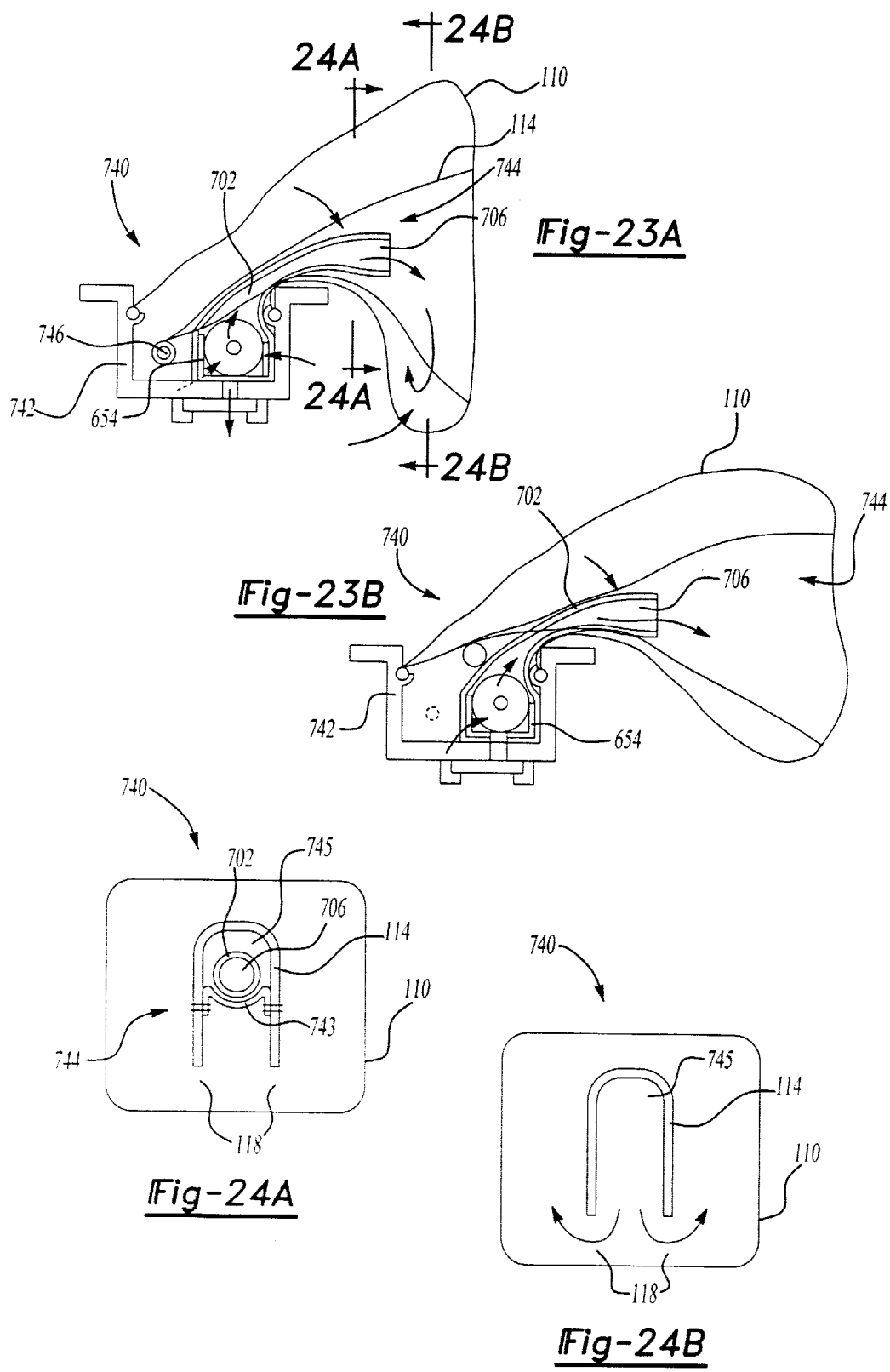

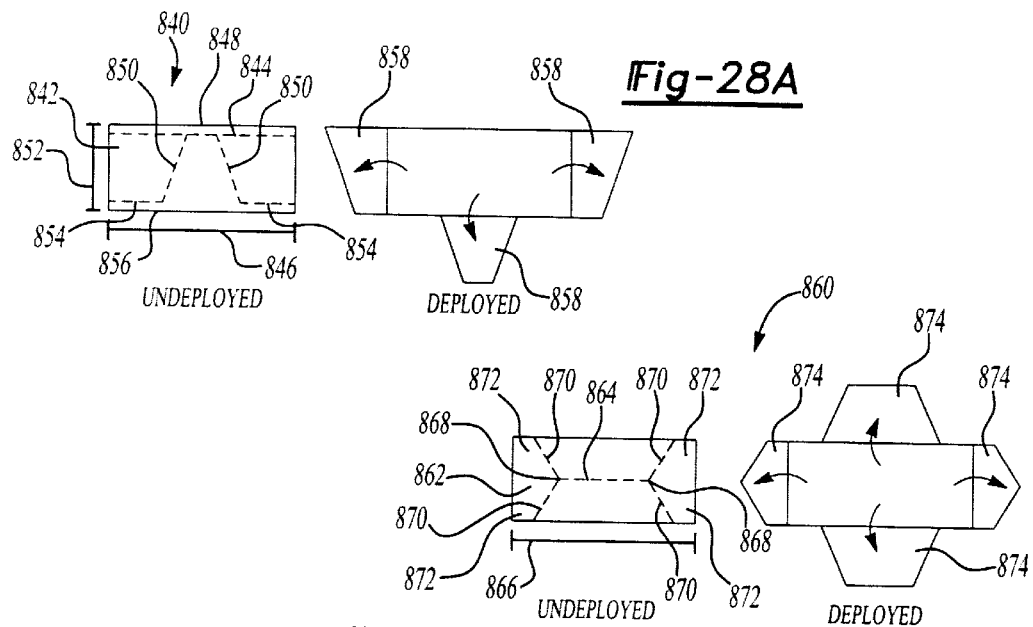
*Fig-28A*
*Fig-28B*
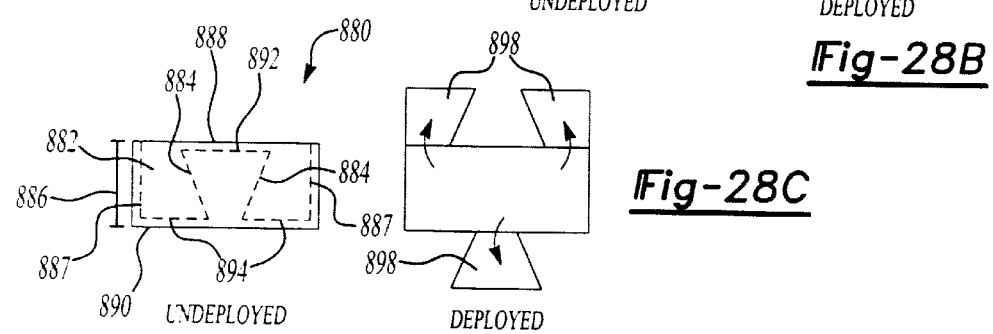
*Fig-28C*
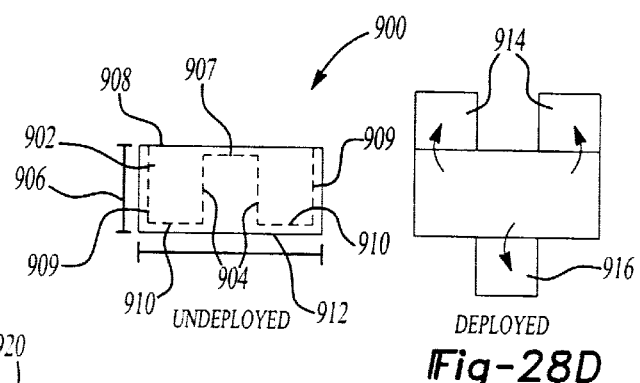
*Fig-28D*
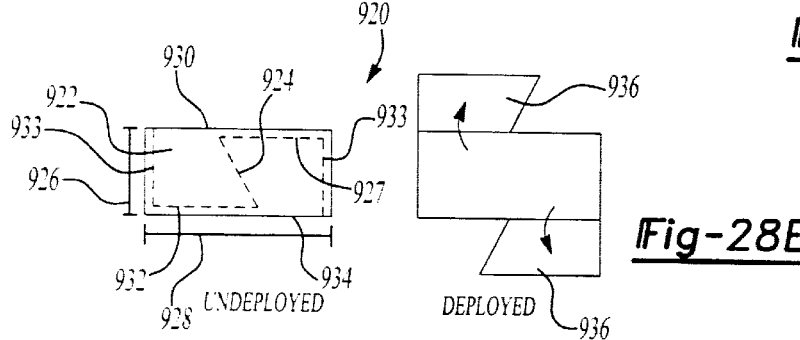
*Fig-28E*

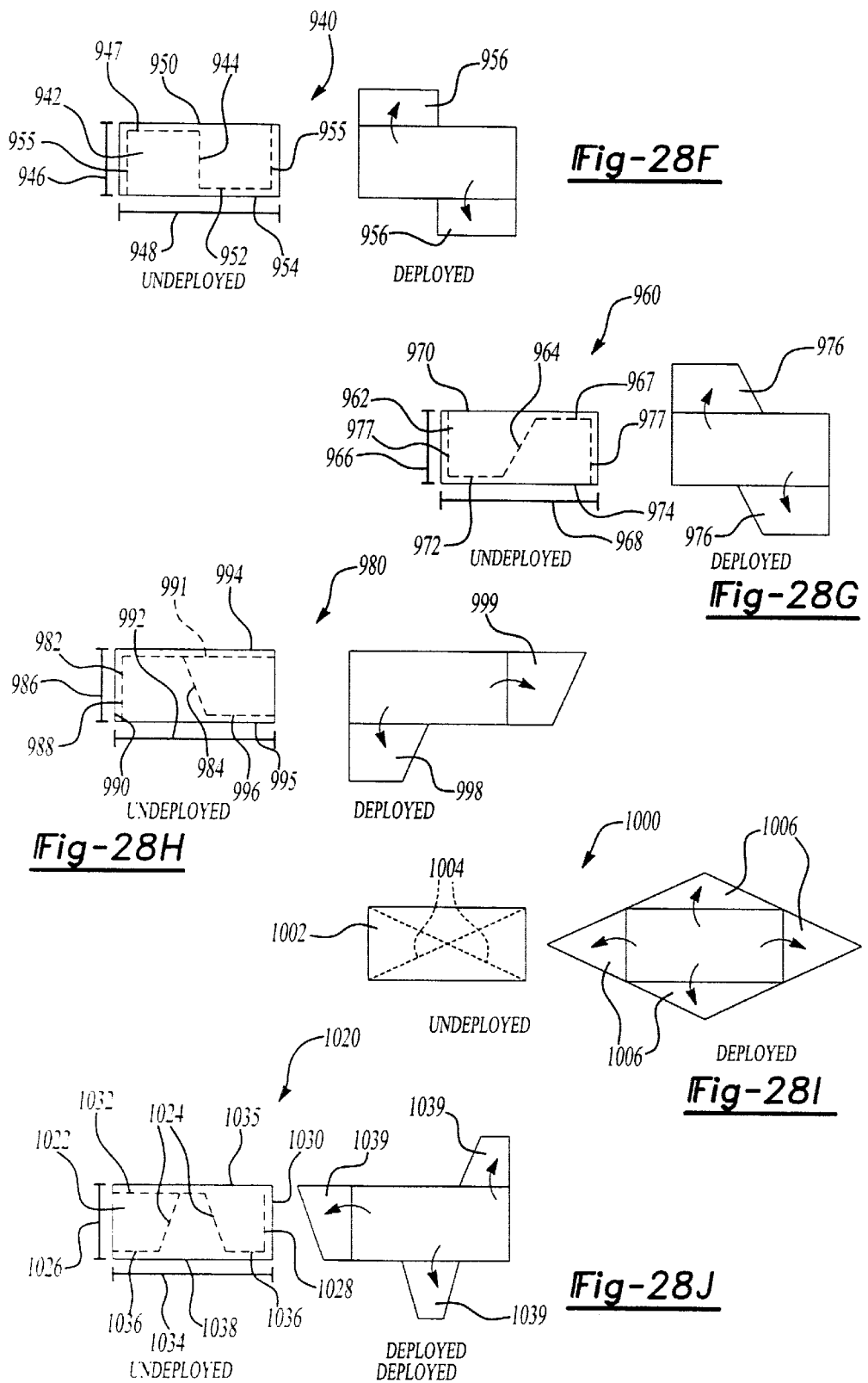

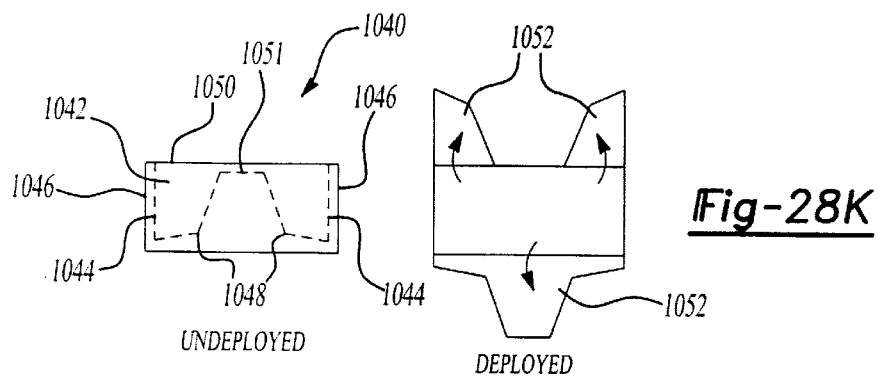
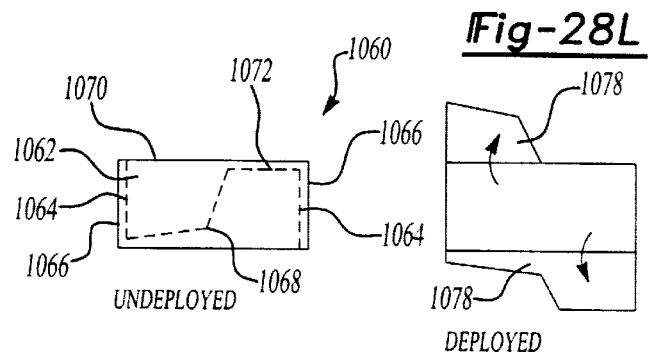
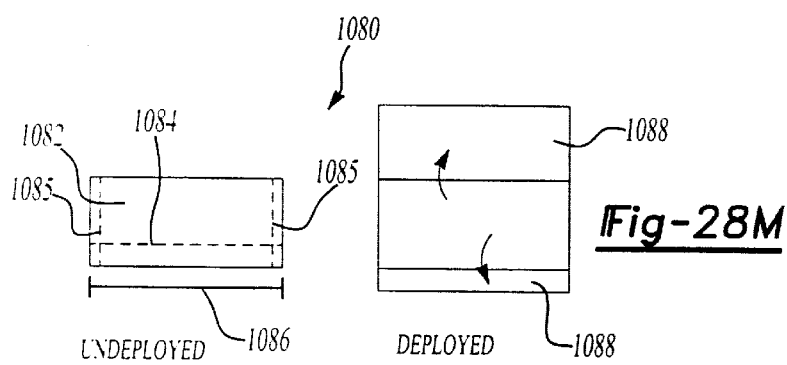
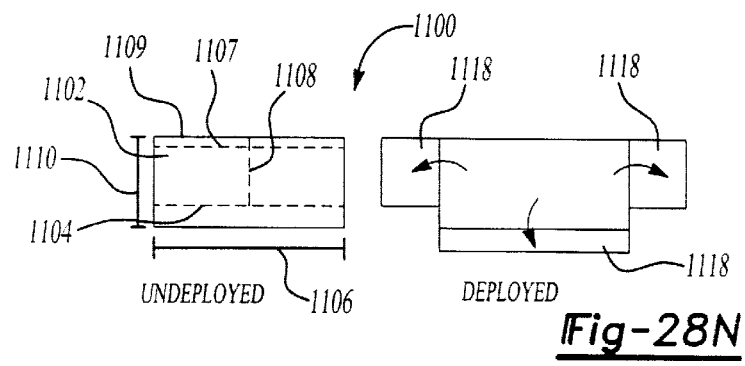

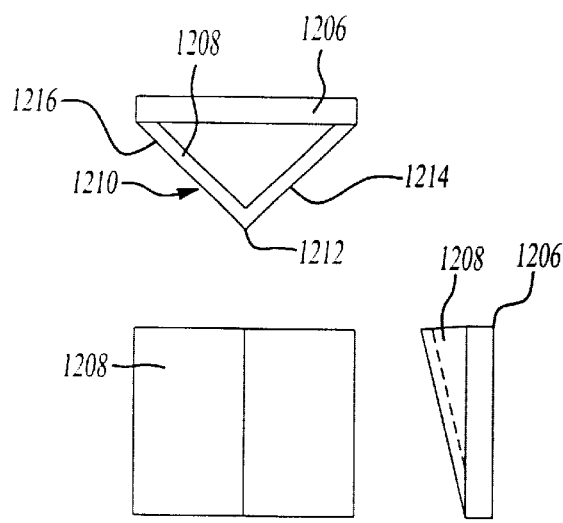
Fig-29A
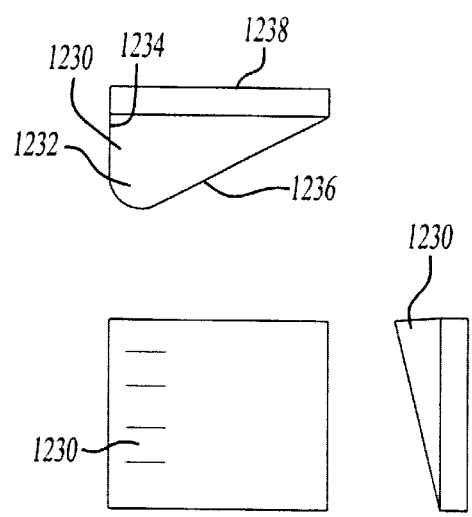
Fig-29B
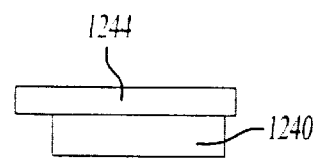
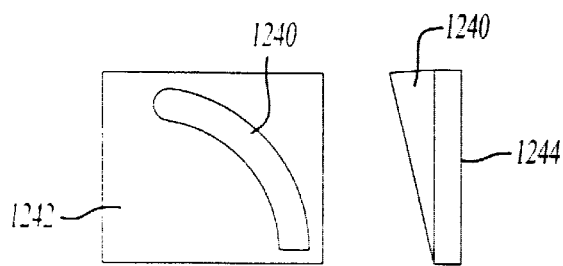
Fig-29C

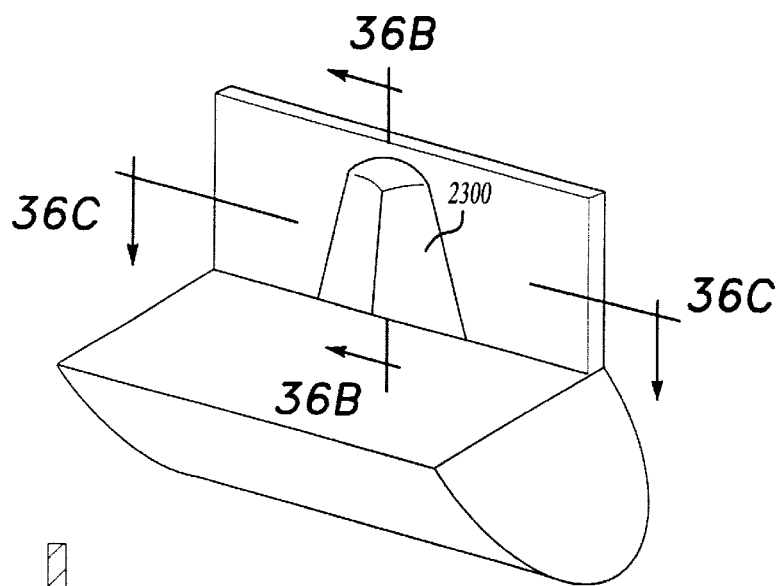
Fig-36A
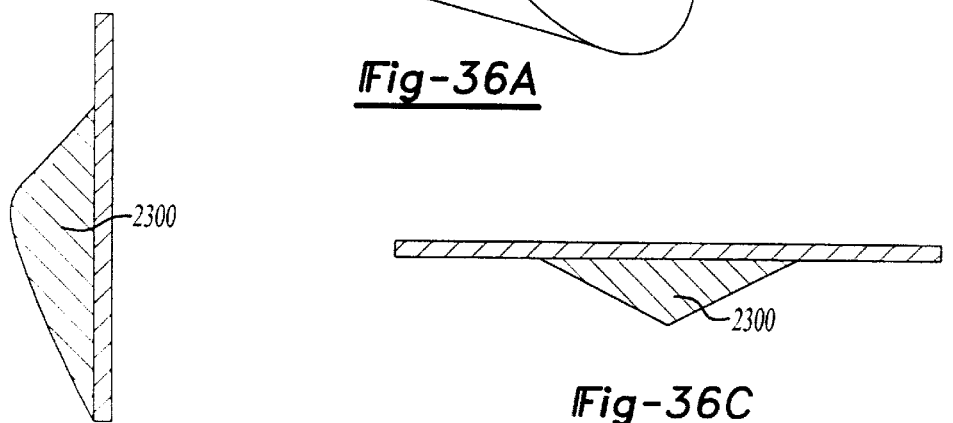
Fig-36B
Fig-36C
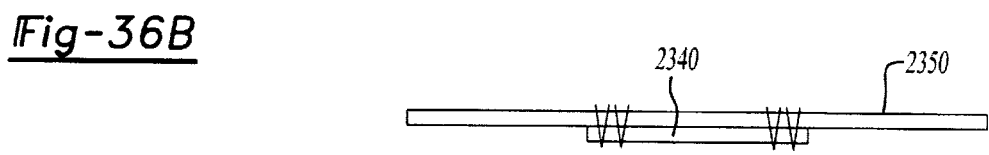
Fig-37B
Fig-37A
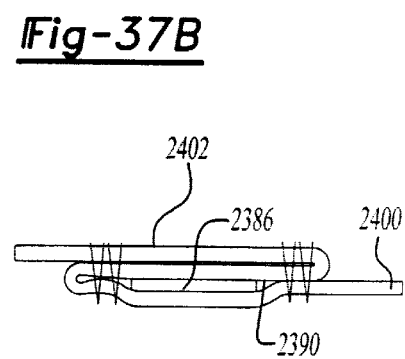
Fig-37D
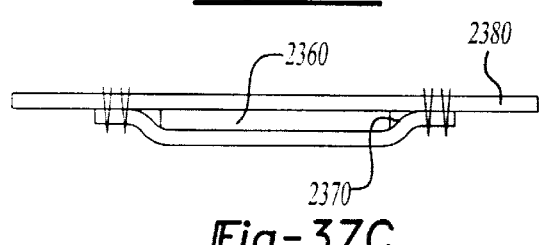
Fig-37C

AUTOMOTIVE VEHICLE AIR BAG SYSTEM

TECHNICAL FIELD

The present invention relates to an automotive vehicle air bag system for deploying an air bag within an automotive vehicle. More particularly, the present invention relates to an automotive vehicle air bag system having one or more systems for assisting in controlling the deployment of an air bag.

BACKGROUND OF THE INVENTION

Air bag systems in automotive vehicles generally include an air bag that is designed to deploy toward a seat of the automotive vehicle when triggered by a sensor signal. For example, air bag systems might be deployed upon sudden deceleration of a vehicle or upon impact of the vehicle with another object. The art continues to investigate alternative ways to deploy air bags. For example, accelerometers have been investigated to determine when a sensor signal should signal the deployment of an air bag. Inflator assemblies have been developed to control how much gas is emitted into an air bag upon deployment.

SUMMARY OF THE INVENTION

The present invention is premised upon yet another alternative way to deploy air bags, which involves controlling the manner of deployment of an air bag at various locations across the air bag.

According to a first aspect of the present invention, there is disclosed one alternative way to deploy an air bag, which involves controlling the direction of gas flow within an air bag during deployment.

According to a second aspect of the present invention, there is disclosed another alternative way to deploy an air bag, which involves controlling the direction of air bag deployment by the packing of the air bag, by the air bag deployment door configuration, by additional guidance materials external to the air bag or a combination thereof.

Accordingly, whether or not employed in combination with one or more additional alternative ways to deploy air bags, the present invention offers air bag system designers additional flexibility in designing air bag systems for placement in any of a number of locations within an automotive vehicle and for different vehicle designs.

These and other objects, aspects, and advantages of the present invention will become apparent upon reading the following detailed description in combination with the accompanying drawings, which depict systems and components that can be used alone or in combination with each other in accordance with the present invention.

BRIEF DESCRIPTION OF THE DRAWINGS

FIGS. 13(a)–13(f) illustrate top views of an eighth illustrative air bag system, showing different stages of deployment.

FIGS. 14(a)–14(f) illustrate top views of a ninth illustrative air bag system, showing different stages of deployment.

FIG. 15 illustrates a top view of a tenth illustrative air bag system.

FIG. 16(a) illustrates a sectional view of a gas emission direction system.

FIG. 16(b) illustrates a sectional view of the gas emission direction system of FIG. 16(a) taken along line 16B—16B.

FIG. 16(c) illustrates a sectional view of a gas emission direction system.

FIG. 16(d) illustrates a sectional view of the gas emission direction system of FIG. 16(c) taken along line 16D—16D.

FIG. 16(e) illustrates a sectional view of a gas emission direction system.

FIG. 16(f) illustrates a sectional view of the gas emission direction system of FIG. 16(e) taken along line 16F—16F.

FIGS. 23(a)–23(b) illustrate top sectional views of a seventeenth illustrative air bag system.

FIGS. 24(a) and 24(b) illustrate sectional views of the air bag systems of FIGS. 23(a)–23(b) respectively taken along the lines 24A—24A and 24B—24B.

FIGS. 28(a)–28(n) illustrate alternative embodiments of deployment door configurations for use in a deployment door guidance system such as in FIGS. 25(a)–25(c).

FIGS. 29(a)–29(c) illustrate embodiments of illustrative flaps for a deployment door of a deployment door guidance system of the type depicted in FIGS. 25(a)–25(c).

FIG. 36(a) illustrates an embodiment of an illustrative stiffening element of a material flap guidance system.

FIG. 36(b) illustrates a sectional view of the stiffening element of FIG. 36(a) taken along line 36B—36B.

FIG. 36(c) illustrates a sectional view of the stiffening element of FIG. 36(a) taken along line 36C—36C.

FIGS. 37(a)–37(d) illustrate alternative embodiments of illustrative stiffening elements for material flap guidance systems.

DESCRIPTION OF THE PREFERRED EMBODIMENT

The present invention relates to an improved air bag system and an automotive vehicle having the same. The following discussion will first discuss air bag systems generally. Thereafter, the discussion will focus on the premises of the present invention, which are directed to inducing different rates of air bag deployment at different locations across an air bag. More particularly, there is disclosed 1) a system for controlling the direction of gas flow within an air bag during deployment (e.g., a baffling system, a gas emission direction system, or both); 2) a system for controlling the direction of air bag deployment external of the air bag (e.g., a deployment door guidance system, a material flap guidance system or both) or 3) a combination of (1) and (2).

Figure 1A:
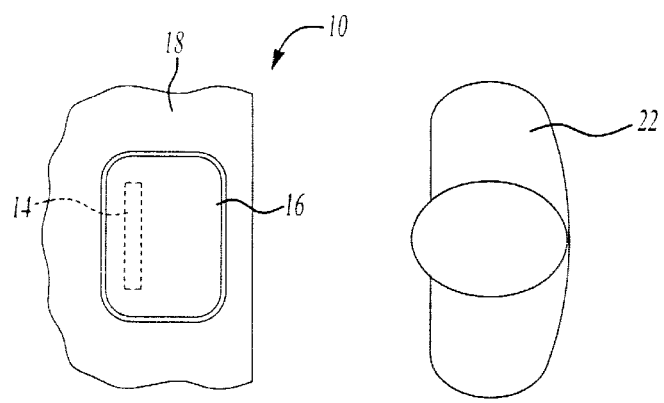
FIGS. 1(a)–1(c) illustrate top views of an illustrative air bag system to illustrate different stages of deployment.
Figure 1B:
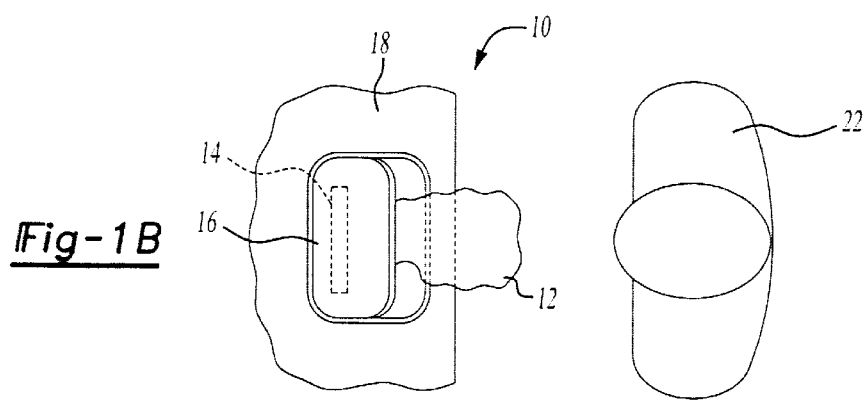
Figure 1C:
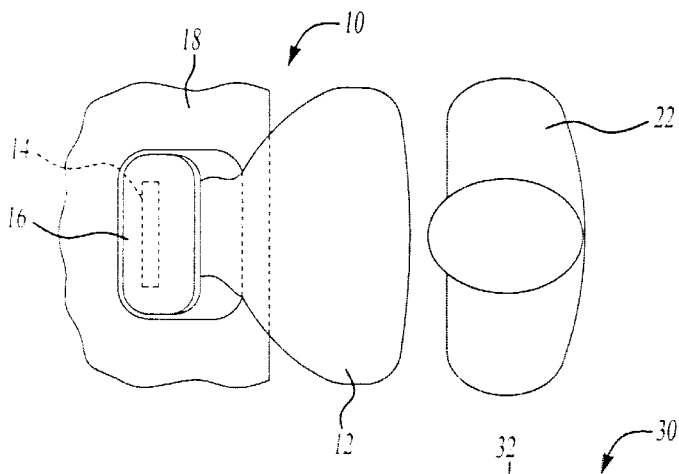

Air bag systems generally may include an air bag, an inflator assembly for emitting gas into the air bag upon a triggering signal from a triggering sensor or system, a housing for storing the air bag prior to deployment and a deployment door, which opens to allow the deployment of the bag. Referring to FIG. 1(a), 1(b) and 1(c), there is shown an air bag system 10 having an air bag 12 and an inflator assembly 14 for releasing gas into the air bag 12. In FIG. 1(a), the air bag 12 is in a non-deployed state and is therefore disposed behind a deployment door 16 that is mounted within or upon a dashboard 18 or other interior structure of an automotive vehicle. In FIGS. 1(b) and 1(c), the air bag 12 is shown both during deployment of the bag 12 toward an individual 22 and is shown fully deployed.

The inflator assembly 14 is in signaling communication with a triggering sensor or system. The inflator assembly 14 includes a canister or other suitable container adapted for containing a gas source and one or more outlets for emitting gas liberated from the source into the air bag 12 upon deployment. Thus, the container may contain compressed gas to be emitted into the bag, solid or liquid propellant that ignites thereby producing gas to be emitted into the bag 12, or a combination of compressed gas and solid propellant. Furthermore, the inflator assembly 14 may emit gas at single or multiple level outputs.

The air bag 12 of the system is formed of conventional air bag materials such as nylon, polyester or the like. Preferably it is a woven fabric, which may be uncoated or coated over some or all of it surfaces to selectively control density and porosity of the bag 12, and thus the release of gas from within the bag 12 during and after deployment. Such coatings are known in the art and may be silicone based or the like. Discrete vent holes may also be placed in the walls of the air bag 12 to assist in controlling gas release. As will be appreciated from the discussion herein, the use of selective coating or discrete vents may be substituted or used in combination with other techniques disclosed for varying the rigidity of the air bag and its rate of deployment across the air bag.

Gas Flow Control Systems

The rate of deployment across an airbag may be controlled by controlling the direction of gas flow internally in the air bag during deployment. One way to do this is to employ one or more air bag baffling systems within the air bag. Another way to do this is to employ one or more gas emission direction systems. Combinations of the two may also be employed.

Air Bag Baffling System

A baffling system in accordance with the present invention includes one or more baffles positioned within the interior of an air bag for assisting in directing and controlling the flow of gas within the air bag. The baffle structure contemplates dividing the interior of the air bag into a plurality of compartments such that one compartment within the bag will be substantially inflated prior to substantial inflation of another compartment (that is, different portions of the air bag will inflate at substantially different rates, during different time periods or both). The baffle structure is situated within the air bag to allow gas from an inflator assembly to initially only flow into a predetermined compartment within the bag and, thereafter, gas may flow into one or more other compartments within the bag. Passageways or valves may be employed to accomplish transfer of gas between compartments. Additionally, the bag, the baffle structure or both may include tear seams, which selectively tear during bag deployment for controlling the flow of gas into and within the air bag.

Figure 2A:
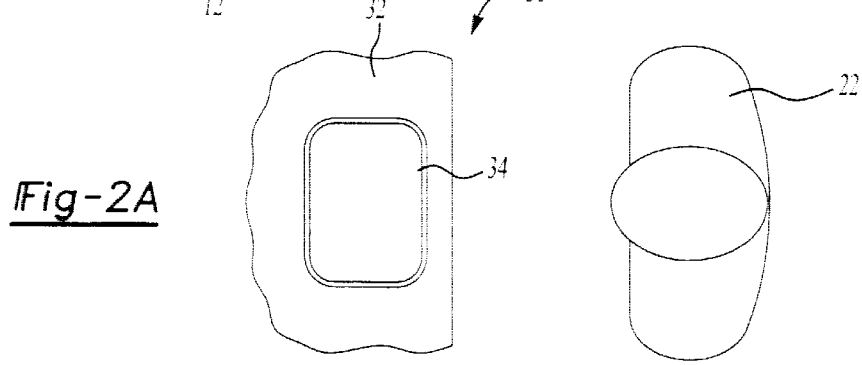
FIGS. 2(a)–2(c) illustrate top views of a second illustrative air bag system, also illustrating different stages of deployment.
Figure 2B:
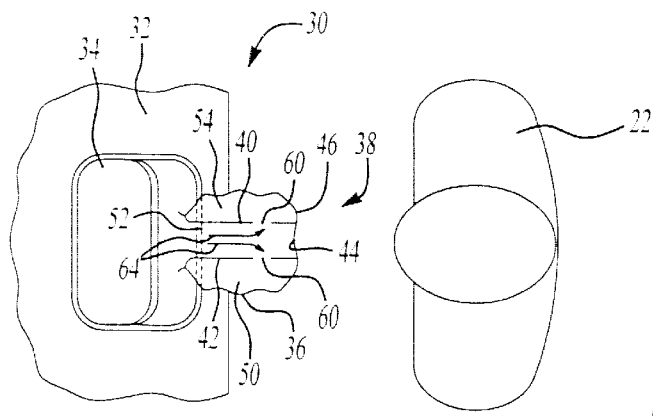
Figure 2C:
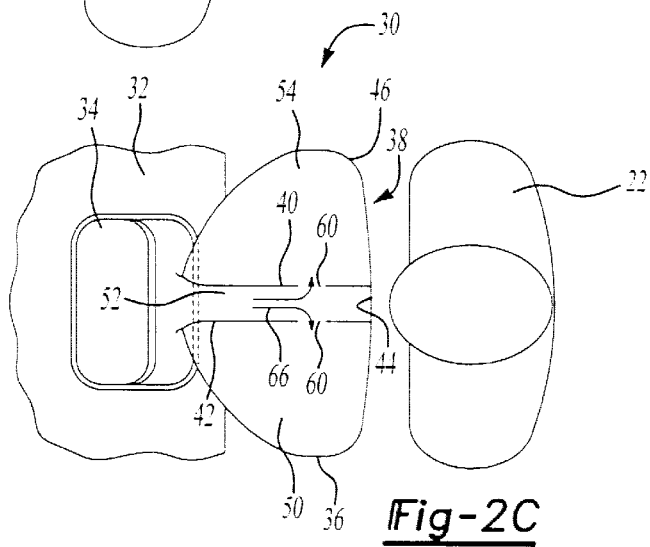

Referring now to FIGS. 2(a) through 2(c), there is illustrated an air bag system 30 of an automotive vehicle (not shown). The system 30 is mounted in or adjacent the dashboard 32 of the vehicle behind a deployment door 34, and the system 30 includes an air bag 36 having an inner surface 44, an outer surface 46 and an interior baffling system 38. The baffling system 38 includes a first baffle 40 and a second baffle 42. As will be appreciated, the present invention may be employed in any suitable air bag environment such as associated with other interior panels, vehicle frame members, seating systems, consoles, steering wheels or the like. The systems as desired could be positioned to deploy toward a passenger head, arms, torso, legs and hips or otherwise.

As shown, the baffles 40, 42 extend substantially continuously about the inner surface 44 of the air bag 36 and divide the bag 36 into a first, second and third compartment 50, 52, 54. As desired, the baffles 40,42 include one or more vents 60 for interconnecting the first, second and third compartments 50, 52, 54 and selectively allowing gas flow therebetween.

The baffles 40, 42 may be formed of the same or different material as the air bag 36 and may be fastened to a wall of the air bag 36 (e.g., by sewing, adhesive, heat staking or otherwise).

Upon deployment, the gas is initially released by an inflator assembly directly into the second compartment 52 through an inlet of the bag 36 as shown by arrows 64 thereby substantially inflating the second compartment 52. Preferably, the baffles 40, 42 are sewn into the air bag 36 substantially continuously about or adjacent the inlet of the air bag 36 into which the inflator assembly emits gas thereby only allowing gas to initially enter the second compartment 52. In this manner, the second compartment 52 is inflated and thereafter, gas flows from the second compartment 52 into the first and third compartments 50, 54 through the passageways 60 as shown by arrows 66 thereby inflating those compartments 50, 54 after the second compartment 52 is substantially inflated. Thus, although the first and third compartments 50, 54 may become partially inflated as the second compartment 52 is inflated, the first and third compartments 50, 54 become substantially inflated only after the second compartment 52 becomes substantially inflated. In this manner, inflation can be controlled so that the bag 36 is initially laterally unstable and can move to the side of an out of position body (e.g., a passenger who is relatively close to the dashboard 32 or positioned offset laterally to either side of the airbag system 30) as the second compartment 52 is inflated, and then the first and third compartments 50, 54 may be inflated to stabilize the bag 36.

Figure 3A:
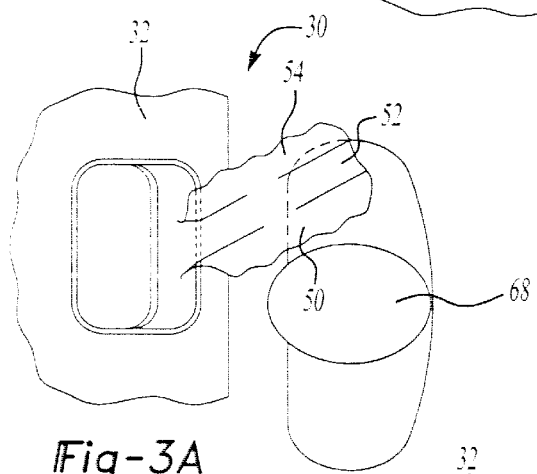
FIGS. 3(a)–3(b) illustrate top views of the second illustrative air bag system, showing different stages of deployment relative to a passenger seated in an offset position.
Figure 3B:
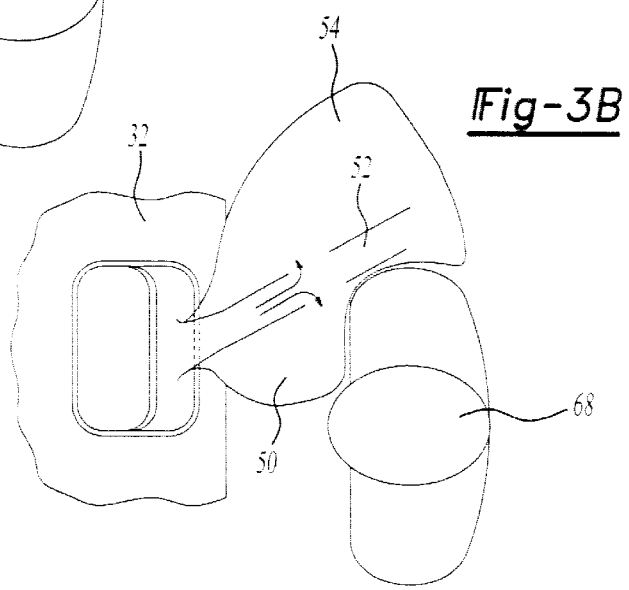

Referring to FIGS. 3(a) and 3(b), there is illustrated a body 68 that is substantially close to the dashboard 32 and laterally offset. As can be seen, the middle compartment 52 of the air bag 36 substantially inflates and allows the laterally unstable air bag 36 to move around the torso of the passenger 68 before the first compartment 50 and third compartment 54 substantially inflate to stabilize the bag 36.

Figure 4K:
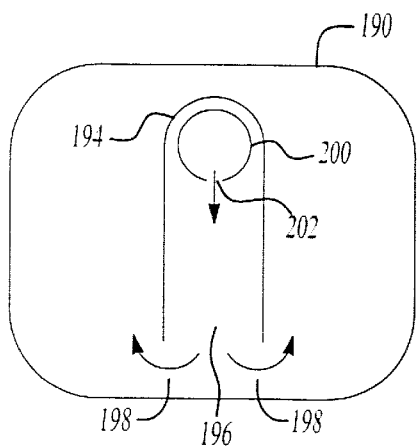
FIG. 4 illustrates a side view of the second illustrative air bag system.
FIGS. 4(a)–4(o) illustrate sectional views of alternative baffle arrangements in an air bag for the illustrative air bag system of FIG. 4 taken along line 4A—4A.
Figure 4L:
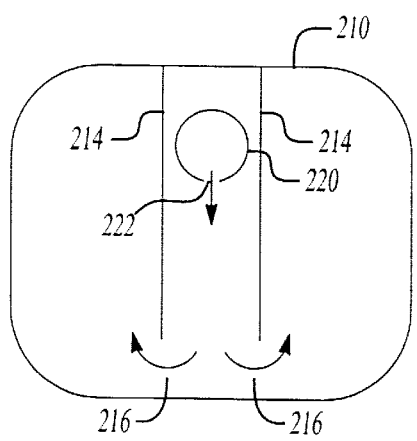
Figure 4M:
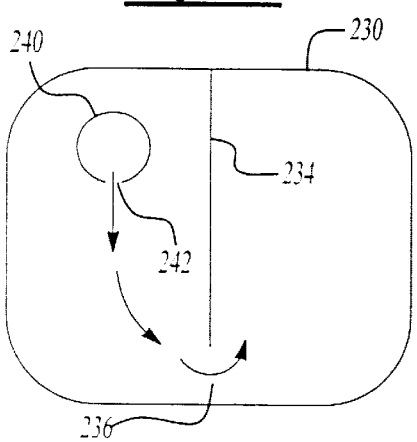
Figure 4N:
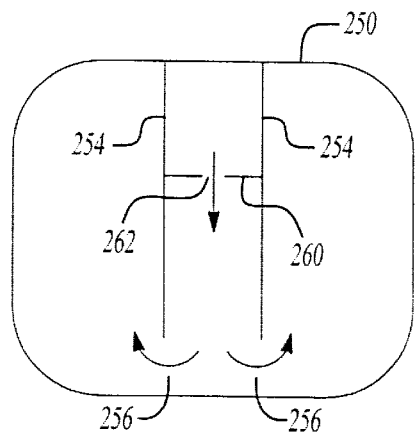
Figure 4O:
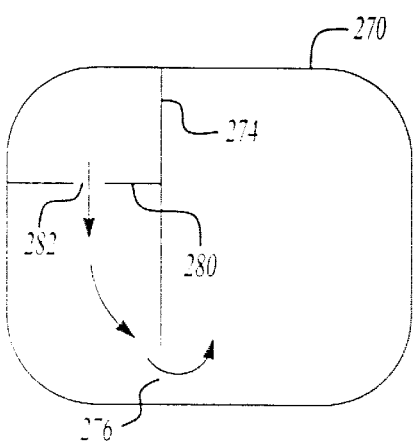

Illustrative variations of the above type of air bag structure are shown in FIGS. 4(a)–4(o), in which generally straight baffles, generally curved baffles or a combination are employed. Though illustrated in the drawings in a particular configuration, other orientations may be used as well. For convenience, all alternative baffling systems are shown as cross sections taken from an air bag 72 shown in FIG. 4, however, the skilled artisan will recognize that the baffling systems of FIGS. 4(a)–4(b) may be used with or can be altered to be used with air bags having an alternative configuration to the configuration of the air bag 72 of FIG. 4. In the air bag 72 of FIG. 4, gas is emitted from an area adjacent a dashboard 74 from an inflator assembly (not shown) as indicated by an arrow 76 extending into the bag 72. In many of the depicted configurations, the inlet of the air bag into which gas enters is located toward the dashboard and generally in the center part of the air bag.

Referring to FIG. 4(a), there is illustrated an air bag 80 including a baffling system having a pair of substantially parallel baffles 84 wherein the baffles 84 include passageways 86 at first and second ends of the baffles 84.

Referring to FIG. 4(b), there is illustrated an air bag 90 including a baffling system having a single baffle 94 substantially centered in the air bag 90 wherein the baffle 94 includes passageways 96 at a first and second end of the baffle 94.

Referring to FIG. 4(c), there is illustrated an air bag 100 including a baffling system having a pair of substantially parallel baffles 104 in the air bag 100 wherein the baffles 142 include passageways 106 at an end of the baffles 104.

Referring to FIG. 4(d), there is illustrated an air bag 110 including a baffling system having a generally inverted arcuate (e.g., "U-shaped") baffle 114 in the air bag 110 wherein the baffle 114 at least partially surrounds an area within the air bag 110 into which gas is emitted and the baffle includes an opening 116 that opens toward a lower portion 117 of the air bag 110 thereby forming passageways 118 adjacent the lower portion 117 of the air bag 110.

Referring to FIG. 4(e), there is illustrated an air bag 120 including a baffling system having a generally arcuate (e.g., "U-shaped") baffle 124 in the air bag 120 wherein the baffle 124 at least partially surrounds an area within the air bag 120 into which gas is emitted and the baffle 124 includes an opening 126 that opens toward an upper portion 127 of the air bag 120 thereby creating vents 128 adjacent the upper portion 127 of the air bag 120.

Referring to FIG. 4(f), there is illustrated an air bag 130 including a baffling system having a generally cylindrical shaped baffle 134 in the air bag 130 wherein the baffle 134 at least partially surrounds an area within the air bag 130 into which gas is emitted and the baffle 134 includes a first and second passageway 136 that open laterally toward the sides of the air bag 130.

Referring to FIG. 4(g), there is illustrated an air bag 140 that includes a baffling system having a pair of generally parallel baffles 144 wherein the baffles 144 include passageways 146 generally centrally located upon the baffles 144.

Referring to FIG. 4(h), there is illustrated an air bag 150 that includes a baffling system having a generally centrally located single member baffle structure 154 substantially dividing the inner area of the air bag 150 in parts wherein the baffle 154 includes an intermediate disposed passageway 146.

Referring to FIG. 4(i), there is illustrated an air bag 160 that includes a baffling system having a single baffle 164 substantially dividing the inner area of the air bag 160 in half wherein the baffle 164 includes a passageway 166 located adjacent one end of the baffle 164.

Referring to FIG. 4(j), there is illustrated an air bag 170 that includes a baffling system having a generally arcuate (e.g., "U-shaped") baffle 174 in the air bag 170 wherein the baffle 174 at least partially surrounds an area within the air bag 170 into which gas is emitted and the baffle 174 includes an opening 176 that opens toward an first portion of the air bag 170 thereby creating passageways 178 adjacent the lower portion of the air bag 170. Furthermore, the baffling system 172 includes a panel baffle 180 that substantially encloses the area into which gas is emitted with the exception of a passageway 182 that allows gas to escape toward the passageways 178.

Referring to FIG. 4(k), there is illustrated an air bag 190 that includes a baffling system having a generally arcuate (e.g., "U-shaped") baffle 194 in the air bag 190 wherein the baffle 194 at least partially surrounds an area within the air bag 190 into which gas is emitted and the baffle 194 includes an opening 196 that opens toward a first portion of the air bag 190 thereby creating passageways 198 adjacent the lower portion of the air bag 190. Furthermore, the baffling system includes a continuously enclosed baffle 200 (illustrated without limitation as cylindrical) that substantially encloses the area into which gas is emitted with the exception of a passageway 202 that allows gas to escape toward passageways 198.

Referring to FIG. 4(l), there is illustrated an air bag 210 that includes a baffling system having a pair of substantially parallel baffles 214 in the air bag 210 wherein the system and/or the baffles 214 include passageways 216 at a lower end of the baffles 214. Furthermore, the baffling system 212 includes a continuously enclosed baffle 220 (illustrated without limitation as cylindrical) that substantially encloses the area into which gas is emitted with the exception of a passageway 222 that allows gas to escape toward passageways 216.

Referring to FIG. 4(m), there is illustrated an air bag 230 that includes a baffling system having a generally centralized planar baffle 234 substantially dividing the inner area of the air bag 230 into compartments wherein the baffle 234 includes a passageway 236 located adjacent one end of the baffle 234. Furthermore, the baffling system includes a continuously enclosed baffle 240 (illustrated without limitation as cylindrical) that substantially encloses the area into which gas is emitted with the exception of a passageway 242 that allows gas to escape toward the passageway 236.

Referring to FIG. 4(n) there is illustrated an air bag 250 including a baffling system having a pair of substantially parallel baffles 254 in the air bag 250 wherein the system and/or the baffles 254 include passageways 256 at a lower end of the baffles 254. Furthermore, the baffling system includes a panel baffle 260 that together with the parallel baffles 254 substantially encloses the area into which gas is emitted with the exception of a passageway 262 that allows gas to escape toward passageways 256.

Referring to FIG. 4(o) there is illustrated an air bag 270 that includes a baffling system having a generally centralized planar baffle 274 substantially dividing the inner area of the air bag 270 into compartments wherein the baffle 274 includes a passageway 276 located adjacent one end of the baffle 274. Furthermore, the baffling system includes a panel baffle 280 that together with the centralized baffle 274 substantially encloses the area into which gas is emitted with the exception of a passageway 282 that allows gas to escape toward the passageway 276.

The person of skill in the art will recognize that the baffles of FIGS. 4(a)–4(o) can be assembled in a substantially similar manner to the baffles of FIGS. 2(a)–3(b). Furthermore, the person of skill in the art will recognize that the baffles of FIGS. 4(a)–4(o) operate to control gas in a substantially similar manner to the baffles of FIGS. 2(a)–3(b) in the sense that gas is directed into one or more compartments of a given air bag to fill or selectively substantially fill those one or more compartments at predetermined rates prior to filling other compartments.

Tear Seams

Consistent with the above, a baffling system may include tear seams or the like to assist the baffles in directing the flow of air within the air bag thereby assisting in controlling the kinematics of the deployment of the air bag. The tear seams of the baffling system preferably are seams that are of reduced strength relative to the air bag itself, and will thus be rupturable at deployment pressures withstandable by the air bag. Accordingly, the tear seams may be formed by stitching with a suitable stitch density, by serrations in material, reduced section thickness, selective adhesion or the like. The tear seams, thus, releasably attach a portion of the air bag to itself or to one or more baffles or attach a baffle to itself or another baffle. Such tear seams will become detached and tear away when pressure in an adjoining portion of the air bag reaches a threshold amount, and thereby will permit gas passage and expansion into other regions of the air bag.

Figure 5A:
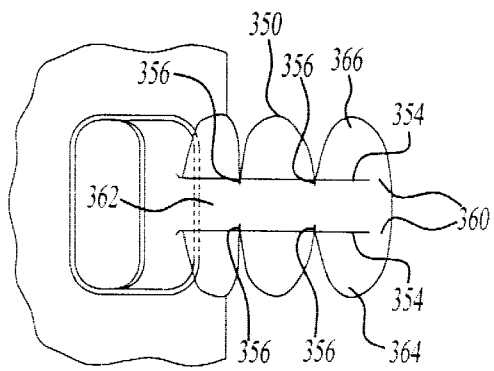
FIGS. 5(a)–5(b) illustrate top views of a third illustrative air bag system, showing different stages of deployment.
Figure 5B:
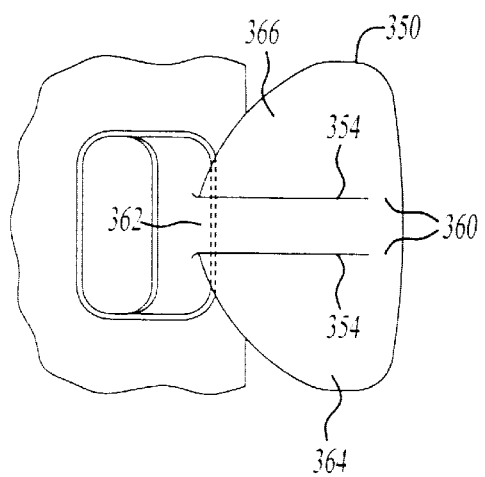

Referring to FIGS. 5(a) and 5(b), there is illustrated an air bag 350 having a baffling system that includes a pair of generally parallel baffles 354, and wherein the air bag 350 is substantially identical to the air bag 36 of FIGS. 2(a)–2(c) with the exception that tear seams 356 have been formed by releasably securing (e.g., by sewing) the bag 350 to the baffles 354. In the embodiment shown, a first side of the bag 350 has been releasably sewed to one of the baffles 354 at two locations and a second side of the bag 350 has been releasably sewed to another of the baffles 354 at two locations. The skilled artisan will recognize that passageways may be defined in a variety of locations and quantities along the baffles 354. In the embodiment shown, the baffles 354 include passageways 360 toward a distal end of each baffle 354.

In operation, gas is emitted into a first compartment 362 of the air bag 350, the first compartment 362 residing between and being substantially or at least partially defined by the baffles 354. The first compartment 362 receives gas until it is substantially filled. As gas is emitted into the first compartment 362, gas also escapes through the passageways 360 into a second and third compartment 364, 366. Once the first compartment 362 is substantially filled, pressure in the second and third compartment 364, 366 elevates until the seams 356 which are now placed in tension, are broken or otherwise released before the second and third compartments 364, 366 can substantially inflate. In this manner, the tear seams 356 assist to control the air bag deployment kinematics and the relative rates of inflation of the second and third compartments 364, 366 enabling them to inflate after the full or substantial inflation of the first compartment 362.

Figure 6:
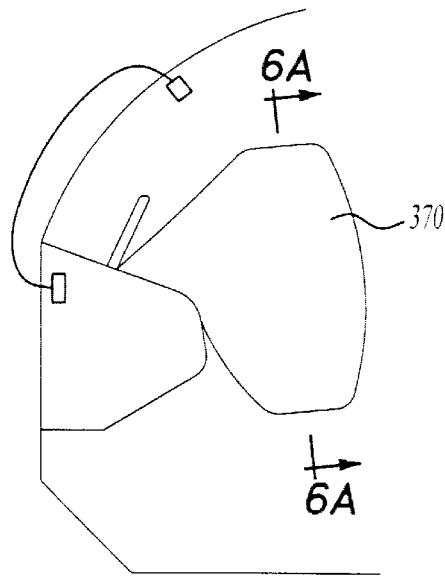
FIG. 6 illustrates a side view of the third illustrative air bag system.
Figure 6A:
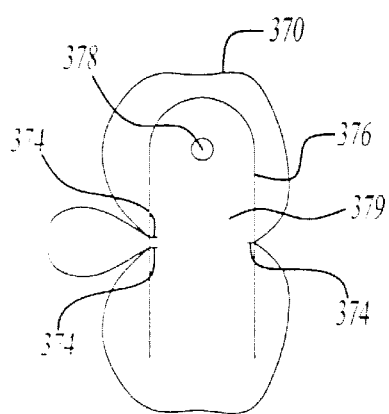
FIGS. 6(a)–6(b) illustrate sectional views of an air bag for the third illustrative air bag system of FIG. 6 taken along line 6A—6A.
Figure 6B:
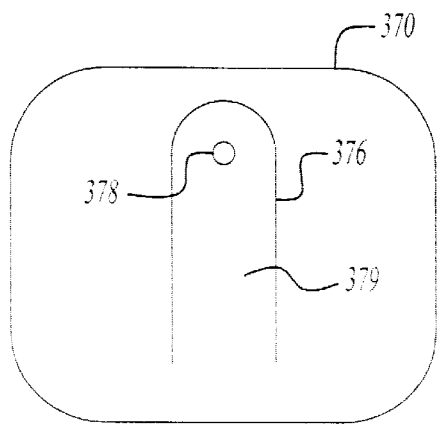

Referring to FIGS. 6–6(b), there is illustrated an air bag 370 having an air bag baffling system that is substantially identical to the baffling system of FIG. 4(d) with the exception that the baffling system of FIGS. 6–6(b) includes tear seams 374. The baffling system includes a baffle 376 in an inverted U-shape just as in the baffling system of FIG. 4(d), however, one side of the air bag 370 has been secured (e.g., sewn) to the baffle 376 at one location while a second side of the air bag 370 has been secured to the baffle 376 at two locations. In operation, gas flows through an inlet 378 into a compartment 379 that is substantially enclosed by the baffle 376 until that compartment 379 is substantially inflated. Thereafter, pressure built up in the compartment ruptures the tear seams 374 to allow gas to flow into the remainder of the air bag 370.

Figure 7A:
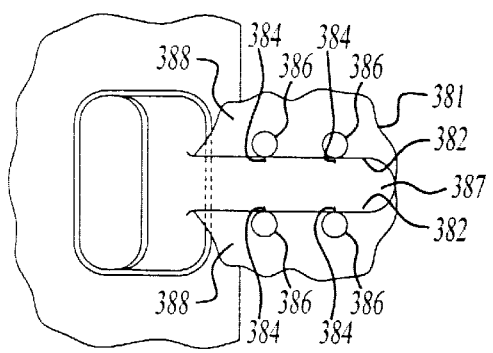
FIGS. 7(a)–7(b) illustrate top views of a fourth illustrative air bag system.
Figure 7B:
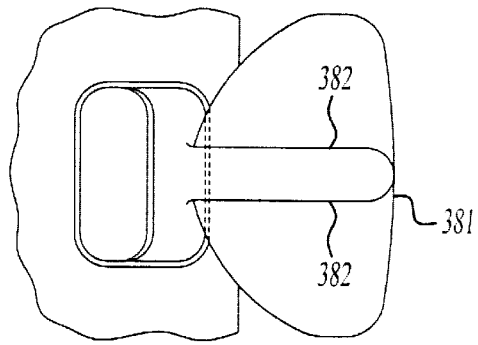

Referring to FIGS. 7(a)–7(b), there is illustrated an air bag 381 with a baffling system having two substantially parallel baffles 382 wherein tear seams 384 are used to attached portions of one or more of the baffles 382 to itself. Each of the baffles 382 include rolls or folds 386 that have been attached to the baffles 382 to form the tear seams 384 such as by sewing one portion of one of the baffles 382 to a second portion of the same baffle 382. In operation, gas enters a first compartment 387 of the air bag 381 and then flows to other compartments 388 through passageways (not shown). Depending upon the location of passageways, the tear seams will either rupture after the first compartment 387 substantially fills or after all the compartments 387, 388 substantially fill.

Figure 8:
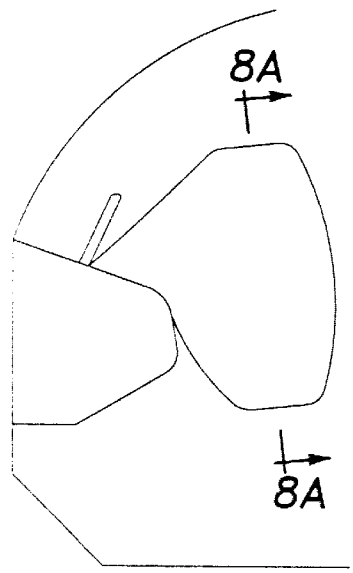
FIG. 8 illustrates a side view of a fifth illustrative air bag system.
Figure 8A:
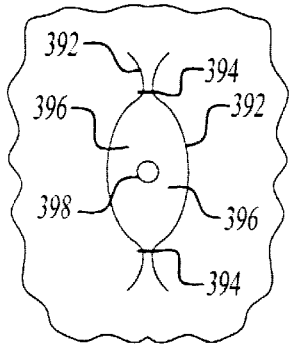
FIGS. 8(a)–8(b) illustrate sectional views of an air bag for the fifth illustrative air bag system of FIG. 8 taken along line 8A—8A to illustrate different stages of deployment.
Figure 8B:
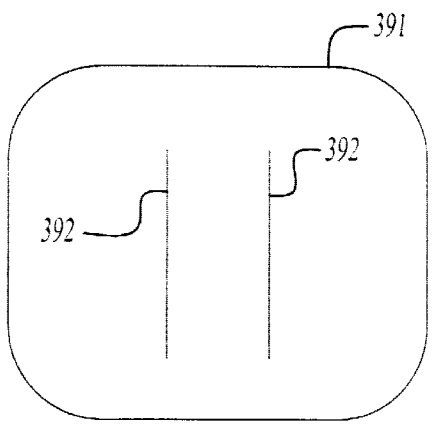

Referring to FIGS. 8 to 8(b), there is illustrated an air bag 391 with a baffling system having a pair of baffles 392 wherein one or more tear seams 394 are used to attach a portion of one baffle 392 to a portion of another baffle 392. Each of the baffles 392 is attached to a portion of the other baffle 392 at least at one and preferably at two or more locations with tear seams 394 to generally enclose a compartment 396 within the air bag 391 into which gas is emitted through an inlet 398. The gas that is emitted into the compartment 396, substantially inflates the compartment 396 and applies tension to the tear seams 394. Thereafter, pressure built up in the compartment 396 ruptures the tear seams 394 to allow gas to flow into the remainder of the air bag 391.

Figure 9A:
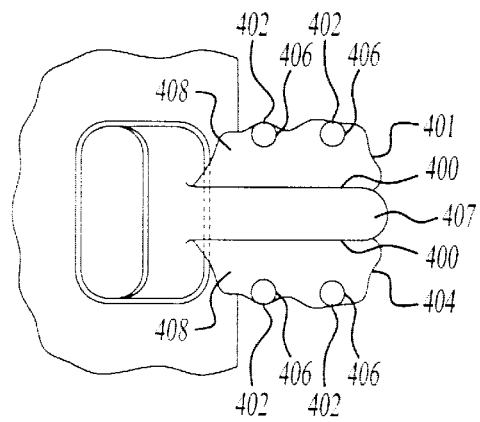
FIGS. 9(a)–9(b) illustrate top views of a sixth illustrative air bag system.
Figure 9B:
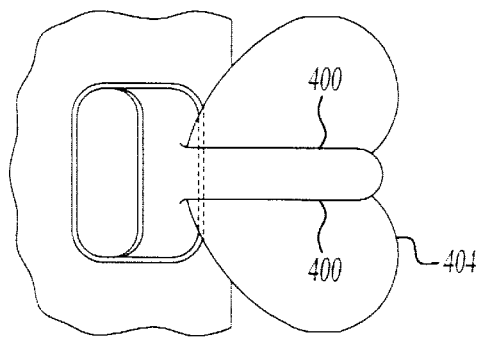
Figure 10A:
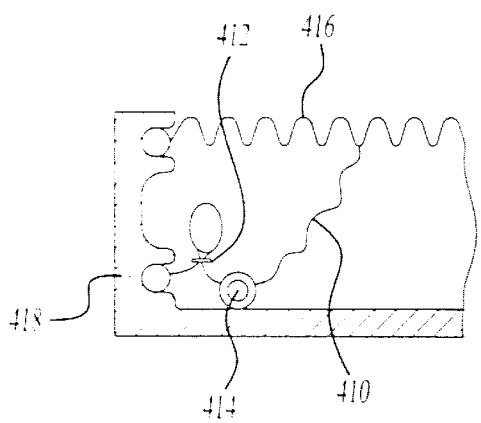
FIGS. 10(a)–10(e) illustrate sectional views of a portion of a seventh illustrative air bag system.
Figure 10B:
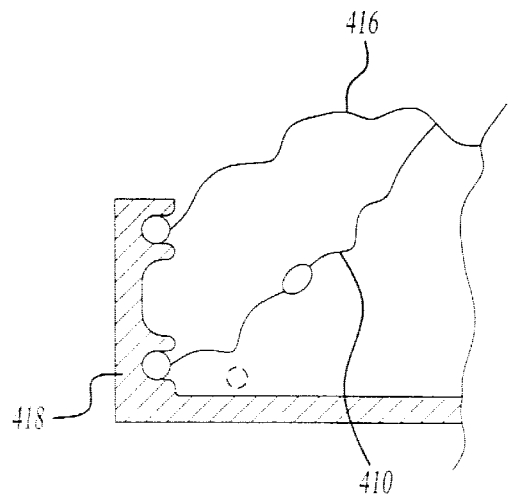
Figure 10C:
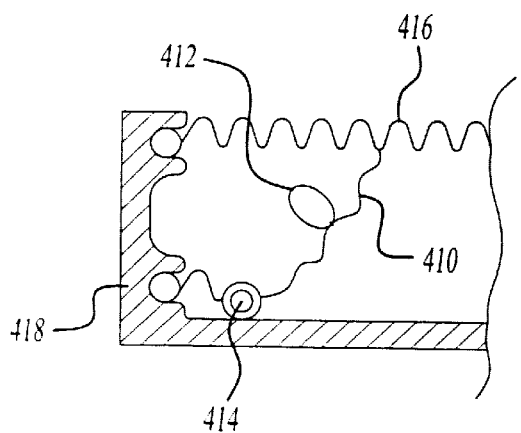
Figure 10D:
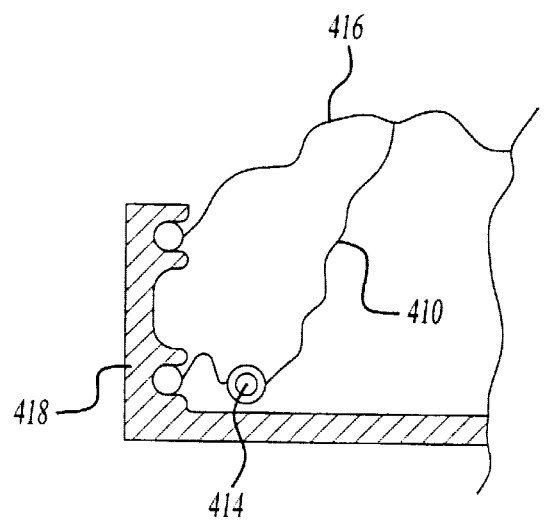
Figure 10E:
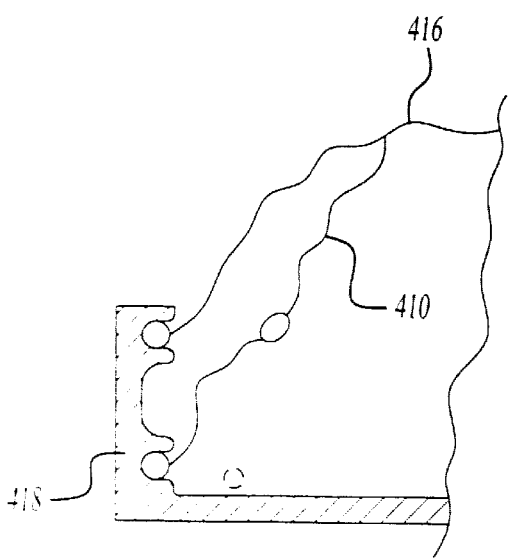

Referring to FIGS. 9(a)–9(b) there is illustrated a baffling system having a pair of baffles 400. Tear seams 402 are used to attach portions of an air bag 404 to each other. The sides of the air bag 404 include rolls or folds 406 that have been sewn into the air bag 404 to form the tear seams 402 by sewing one portion of the air bag 404 to another portion of the air bag 404. In operation, gas enters a first compartment 407 of the air bag 401 and then flows to other compartments 408 through passageways (not shown). Once the gas substantially inflates the other compartments, the tear seams 402 rupture so the bag 401 may be fully inflated.

Referring to FIGS. 10(a)–10(e) there is illustrated portions of a baffling system having a baffle 410. The baffle 410 may include a tear seam 412, a releasable device 414 such as a clip or pin, or both and the baffle 410 may be chosen from any of the baffles disclosed herein. In operation, the baffle 410 is attached to a portion of an air bag 416 and another object 418 such as an air bag housing 418. Upon deployment of the air bag 416 the baffle 410 assists in restraining a portion of the air bag 416 as gas is released into the bag 416 or baffle 410. Thereafter, the releasable device 414 may be deployed or released, the tear seam 412 may be ruptured or both may occur to more fully release the air bag 416. The releasable device 414 may be deployed mechanically pyrotechnically or otherwise and the tear seam 412 may be ruptured by force exerted on the baffle 410 by the inflating bag 416.

Figure 11A:
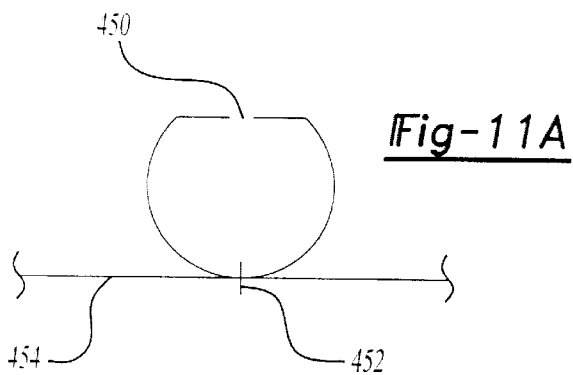
FIGS. 11(a)–11(b) illustrate sectional views of a first illustrative tear seam and passageway configuration for employment in a baffle system.
Figure 11B:
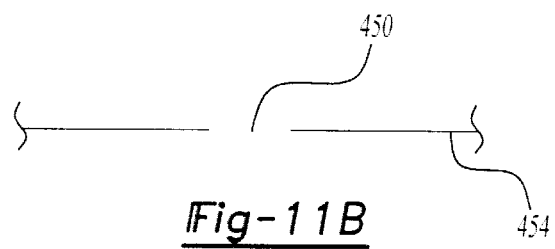

In alternative embodiments, tear seams may be used to releasably close passageways such that gas is substantially or at least partially prohibited from passing through the passageways. Referring to FIGS. 11(a)–11(b), there is illustrated a passageway 450 that has been releasably closed or sealed by incorporating a tear seam 452 into a baffle 454. A first portion of the baffle 454 that is on one side of the passageway 450 is secured to a second portion of the baffle 454 on another side of the passageway 450.

Figure 12A:
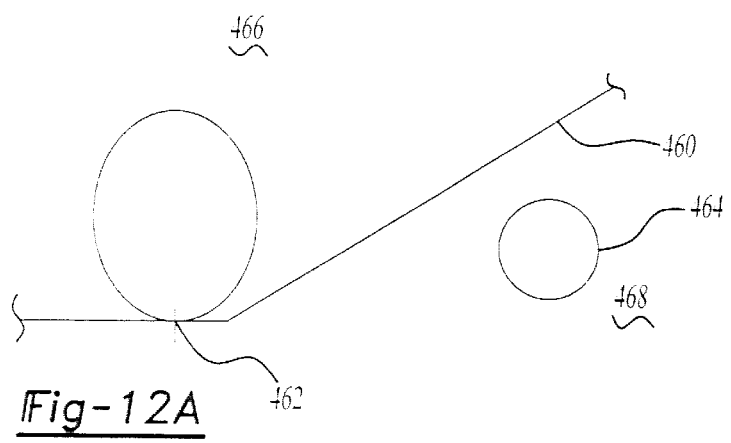
FIGS. 12(a)–12(b) illustrate sectional views of a second illustrative tear seam and passageway configuration for employment in a baffle system.
Figure 12B:
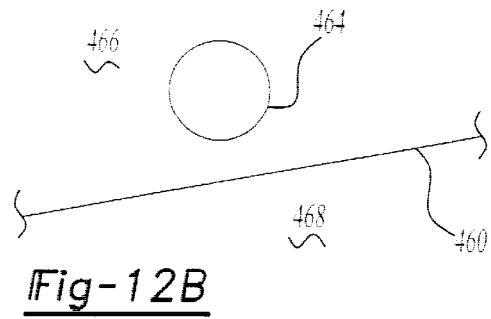
Figure 13A:
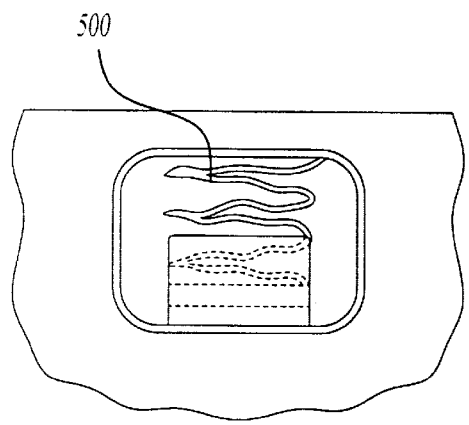
Figure 13B:
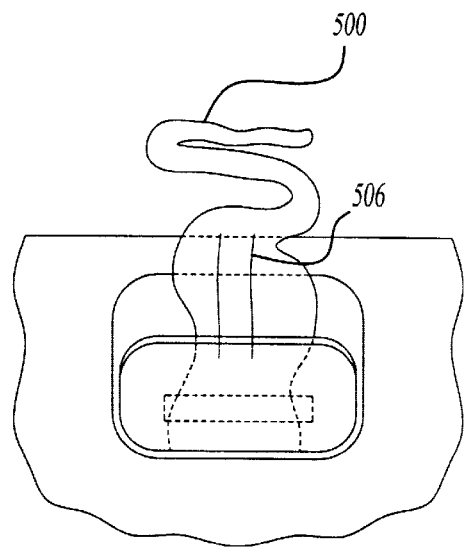
Figure 13C:
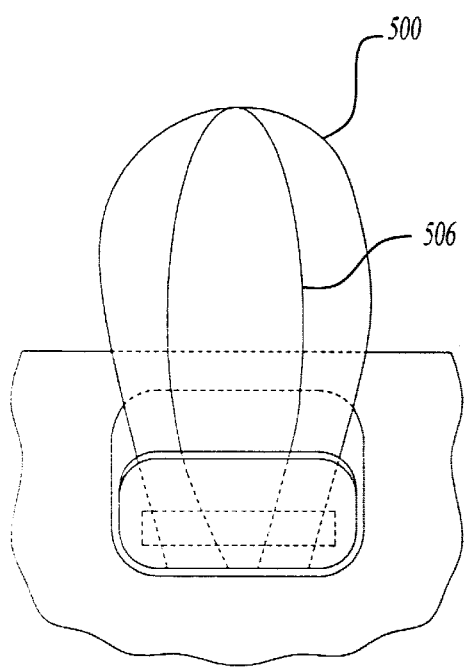
Figure 14A:
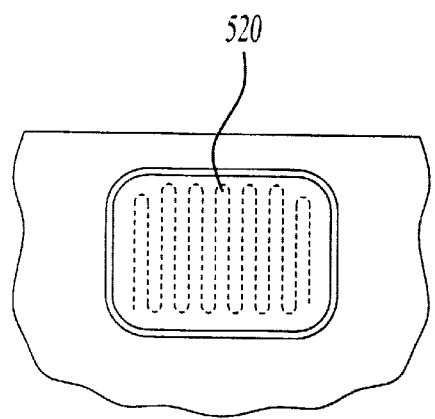
Figure 14B:
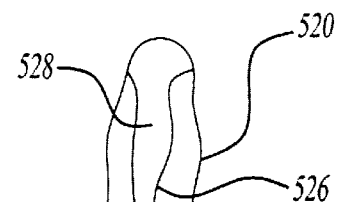
Figure 14C:
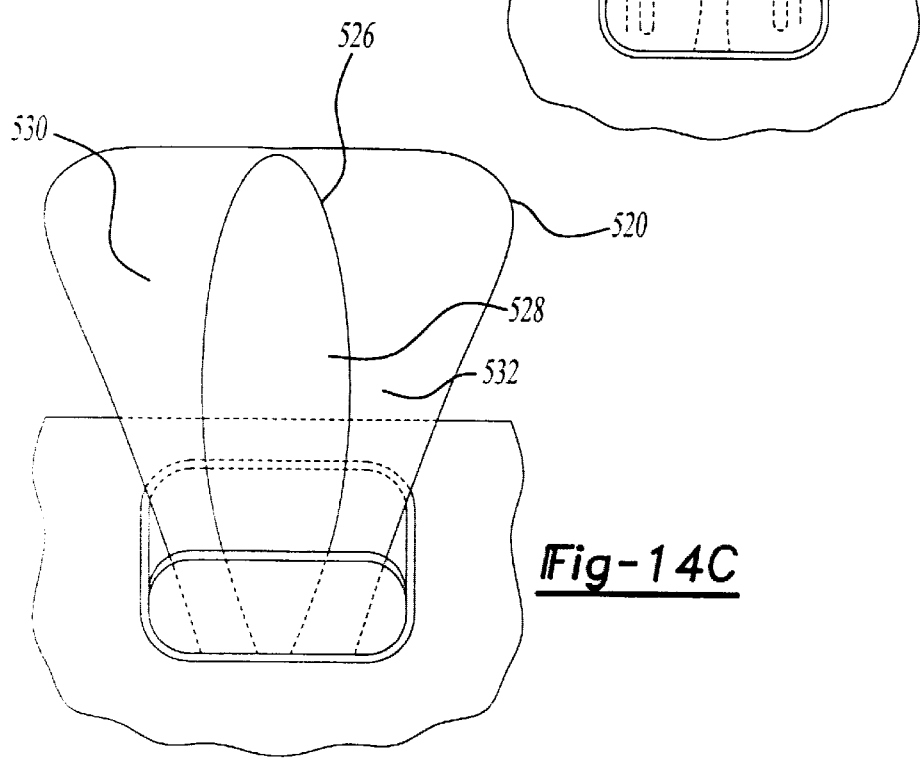

In other alternative embodiments, tear seams may be used to provide access to, or block access to passageways by placing a tear seam in a position upon an air bag or baffle wherein access to a passageway is provided or blocked when the tear seam is broken. Referring to FIGS. 12(a)–12(b) there is shown a portion of an air bag system with a baffle 460 having a fold tear seam 462 wherein a passageway 464 is on one side of the baffle 460 prior to breaking the seam 462, and is on the other side of the baffle 460 after breaking the seam 462. In this manner, the tear seam 462 can control access of a passageway 464 to two compartments 466, 468 within an air bag or a passageway (not shown) through an air bag to the outside atmosphere.

In still other alternative embodiments, the systems of the present invention include folding an air bag behind an air bag door in a particular manner in its non-deployed state, whereby, upon deployment, the folds serve to delay inflation response in the folded regions to assisting in directing or controlling gas flow into the air bag. Referring to FIGS. 13(a)–13(f), there is illustrated an air bag 500 that includes a baffling system having a generally U-shaped baffle 506 wherein the baffle 506 and the bag 500 are folded laterally upon themselves in an accordion-like fashion one or more times prior to packing into a pre-deployment configuration.

Upon deployment, gas is released into the folded bag 500. As gas inflates the bag 500, the bag 500 unfolds to form a "zig-zag" like shape prior to full inflation. As the bag 500 unfolds, it may contact an object such as an out of position individual 508 (e.g., an individual who is relatively close to the dashboard). Since the bag 500 is in a zig-zag shape during unfolding, the bag 500 will tend to deflect away from the individual 508 as it straightens out and therefore move to the side or around the torso of the individual.

An air bag and/or baffles within the air bag may also be longitudinally folded upon themselves while in the non-deployed state. Referring to FIGS. 14(a)–(f), there is illustrated an air bag 520 having a baffling system generally U-shaped baffle 526 wherein the sides of the air bag 520 are folded longitudinally upon themselves, as in FIG. 13 (but re-oriented 90°) one or more times prior to deployment.

Upon deployment, gas is forced into a first compartment 528 of the bag 524 thereby gradually unfolding the sides of the bag 524 to provide access to a second and third side compartment 530, 532 of the bag 524. In this manner, the folds in the sides of the bag 524 assist in delaying airflow into the second and third side compartments 530, 532 until the center compartment 528 can be more fully inflated. Therefore, more time may be available for the bag 520 to move to the side of an out of position individual 534 (e.g., an individual who is relatively close to the dashboard) while air is filling the first compartment 528 and less air is filling the second and third compartments 530, 532.

In another alternative embodiment, as shown in FIG. 15, an air bag 540 may have a baffling system that includes a combination of the above, including both laterally and longitudinally folding the bag 540 and a baffle to benefit from both effects of the air bags 500, 520.

Gas Emission Direction System

The air bag system may also include a gas emission direction system associated with an inflator apparatus for selectively directing gas from the inflator into the air bag. The gas emission direction system will include one or more deflectors for directing emitted gas from a canister adjacent the gas outlet ports of the canister.

Referring to FIGS. 16(a) and 16(b), there is illustrated a gas emission direction system 650 that includes a conventional container or canister 652 of compressed gas solid or liquid propellant or some combination thereof and a deflector 654 attached (e.g., adhesively or otherwise secured) to the canister 652 for directing gas released by the canister 652 through outlet ports 655 in the canister 652. In this manner, the canister 652 and deflector 654 can be pre-assembled together and installed as a unit. As shown, the deflector 654 is attached to the canister 652 and includes a first wall 656, an opposing second wall 658 and a side wall 660 adjoining the first and second wall 656, 658. The side wall 660 may be straight or arcuate and preferably the walls 656, 658, 660 define an opening 662 within the wall 660 for releasing gas or defining a gas flow path into an air bag. In the embodiment shown, the opening 662 is located within the arcuate portion of the side wall 660, however, in alternative embodiments, the opening may be located within the top, bottom or side walls 656, 658, 660 of the module 654.

The person of skill in the art will recognize that a variety of generally rigid deflectors may be formed to direct gas as it is dispensed within an air bag and that rigid materials such as plastic (e.g., plastic molded parts), metal (e.g., stamped steel or aluminum or cast metals) or other suitable materials may be used to form such deflectors. Exemplary deflectors 670 and 680 are shown in FIGS. 16(*c*) through 16(*f*).

In FIGS. 16(*c*) and 16(*d*), the deflector 670 is substantially identical to the deflector 654 of FIGS. 16(*a*) and 16(*b*) with the exception that the module is attached (e.g., adhesively secured, mechanically fastened or otherwise secured) to a member 672 such as a housing external of the canister 652, the member 672 adapted to receive the canister 652. In this manner, the deflector 654 can be pre-assembled to the member and the canister 652 then provided.

In FIGS. 16(*e*) and 16(*f*), the deflector 680 is incorporated as part of a housing 680, which generally envelops a canister 682. The deflector 680 includes a wall 684 partitioning the canister 652 from the air bag. The wall 684 includes an opening 686 for fluid communication with the inside of the air bag. In this manner, gas emitted from the outlet of the canister 682 will fill the volume of the housing and escape into the air bag through the opening 686. A second opening 690 may also be provided for venting purposes if desired.

The deflectors in accordance with the above are rigid, semi-rigid or flexible. They might also be a flexible material that becomes a rigid deflecting surface when placed in tension such as a fabric.

Figure 17A:
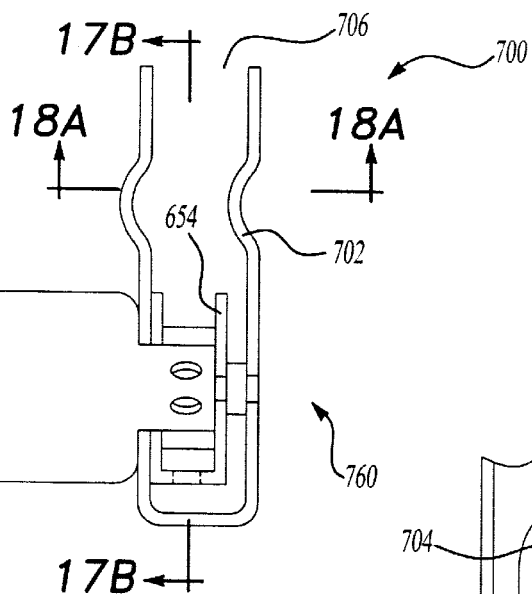
FIG. 17(a) illustrates a sectional view of a gas emission direction system.
Figure 17B:
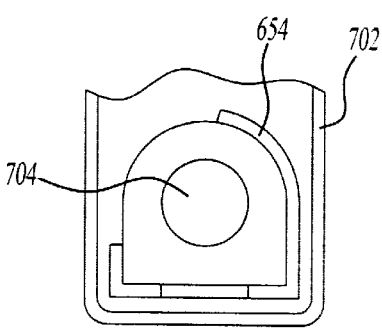
FIG. 17(b) illustrates a sectional view of the gas emission direction system of FIG. 17(a) taken along line 17B—17B.
Figure 18A:
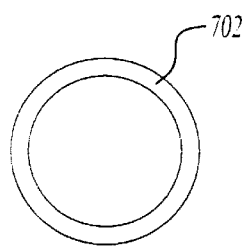
FIGS. 18(a)–18(d) illustrate sectional views of illustrative flexible modules for gas emissions direction systems for a thirteenth illustrative air bag system taken along line 18A—18A.
Figure 18C:
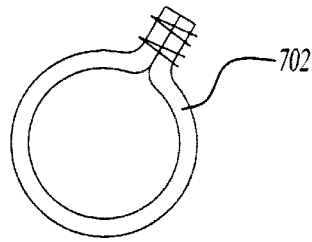
Figure 18B:
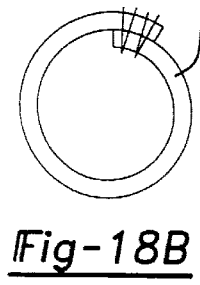
Figure 18D:
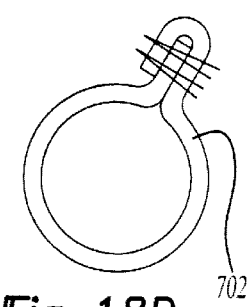

Referring to FIGS. 17(*a*) and 17(*b*), there is illustrated a gas emission direction system 700 having the rigid gas deflector 654 of FIGS. 6(*a*) and 6(*b*) and a flexible gas deflector 702. The deflector 702 is generally tubular and elongated and extends away from a canister 704 which supplies gas to an air bag and the module 702 ends through an opening 706.

It shall be recognized that a module such as the module 702 in FIGS. 17(*a*) and 17(*b*) can direct gas from a gas supply to a portion of an air bag by placing the opening 706 in the area of the air bag into which it is desirable to emit gas. It shall further be recognized that a module such as the module 702 of FIGS. 17(*a*) and 17(*b*) may be used to guide the supply of gas into compartments of air bags made by baffles within the air bag or to guide the supply of gas to one side or the other of a given baffle. Furthermore, the rigid deflector 654 can assist in guiding gas toward the opening 706 of the flexible deflector 702 to assist in avoiding irregular inflation of flexible deflector 702. Finally, any of the deflector configurations in FIGS. 16(*a*) through 16(*f*) may be used to port gas in module 702.

Figure 19:
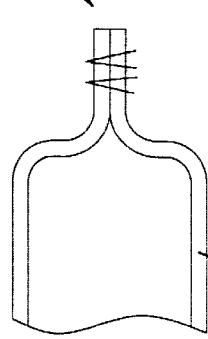
FIG. 19 illustrates a side sectional view of a portion of an illustrative flexible module for a gas emission direction system.
Figure 20A:
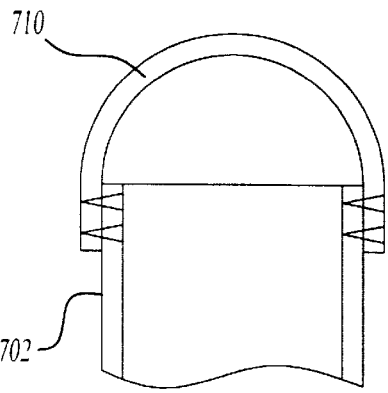
FIGS. 20(a)–20(b) illustrate sectional views of an illustrative gas diffuser for a fourteenth illustrative air bag system.
Figure 20B:
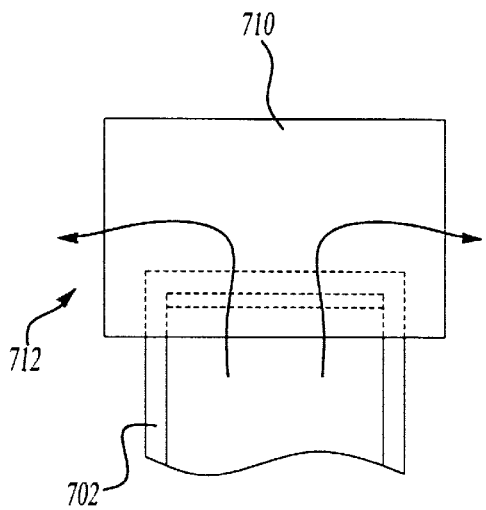

Referring to FIGS. 18(*a*)–18(*d*), showing sectional views of exemplary flexible deflectors 702, it is seen that the deflector 702 may be made as a tubular configuration or from a webbing having edges joined to form a tubular configuration (e.g., as seen in FIGS. 18(*b*)–18(*d*)). Furthermore, the opening 706 may be closed in a manner (e.g., sewn shut) that allows the pressure of gas emitted into the module 702 to open the opening 706 as shown in FIG. 19. In another alternative embodiment, there may be a gas diffuser 710 attached to the end of the module 702, wherein the diffuser forces gas in one or more directions as shown in FIGS. 20(*a*) and 20(*b*). The end of the module 702 or other portions of the module 702 may include one or more selectively openable passageways 712 for allowing gas to exit the module 702.

Figure 21:
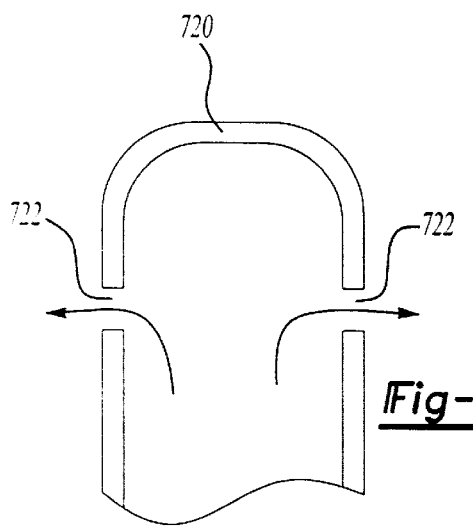
FIG. 21 illustrates a side sectional view of a portion of an illustrative flexible module for a gas emission direction system for a fifteenth illustrative air bag system.

Referring to FIG. 21, there illustrated a flexible module 720 having a pair of passageways 722 that act as a gas diffuser 722.

Figure 22A:
FIGS. 22–22(c) respectively illustrate a side sectional view and three bottom sectional views of a portion of an illustrative flexible module for a gas emission direction system for a sixteenth illustrative air bag system.
Figure 22:
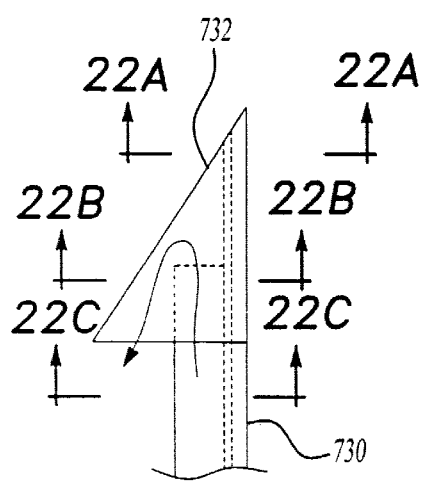
Figure 22B:
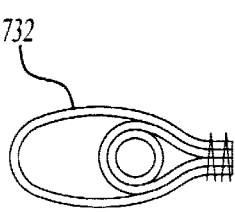
Figure 22C:

Referring to FIGS. 22(*a*)–22(*d*), there is illustrated a flexible module 730 having a "hood" shaped attachment 732 that acts as a gas diffuser 732. In operation, sewing the opening 706 shut as in FIG. 19, or using the gas diffusers 710, 720, 732 of FIGS. 18(*a*)–22(*d*), can assist in directing gas in multiple directions to lessen the output of gas in one direction.

Referring to FIGS. 23(*a*)–23(*b*) and 24(*a*)–24(*b*), there is shown an example of an air bag system 740 that includes a housing 742 and the baffling system of FIG. 4(*d*), including an air bag 110 having an inverted U-shaped baffle 114. The baffle 114 is releasably attached to the housing 742 with a releasable device 746. The baffling system has been combined with a gas directing system 744 having the tigid module 654 of FIGS. 16(*a*) and 16(*b*) and the flexible module 702 of FIGS. 17(*a*) and 17(*b*). The system 740 further includes an optional support member 743. As shown, the flexible deflector 702 has been positioned within the U-shaped baffle 114 and is supported by the support member 743. When gas is released from and inflator assembly into the deflector 654, gas is guided by the deflector 654 toward the opening 706 of the flexible deflector 702 into a compartment 745 generally or at least partially surround by the U-shaped baffle 114 and thereafter, the gas flows through the passageways 118 to a compartment outside the baffle 114 or the remainder of the air bag 110. Furthermore, the air bag 110 and baffle 114 may be extended (as shown in FIG. 23(*b*)) by releasing the baffle 114 with the releasable device 746.

Deployment Door Guidance System

The air bag system may also include a deployment door guidance system that includes a deployment door configured so that the door includes an outer panel for containing the air bag in an air bag assembly. The air bag assembly includes a housing for storing the air bag prior to deployment and the deployment door covers the housing. The air bag is in fluid communication with the deployment door such that the air bag pushes the door open during deployment. The door opens about at least two spaced apart axes into one or a plurality flaps that may assist an air bag of the air bag system to deploy in a particular direction. The axes about which the doors open may be parallel to each, skew with respect to each other or they may intersect or a combination thereof. The axes may be adjacent the edges of the door or located in other positions.

In one aspect, and during deployment of the air bag, the flaps of the door will swing outwardly and at least one flap swings outwardly toward a seat or seating position into which the air bag is to be deployed. If the flap encounters an opposing structure or body during deployment of the air bag, the flap will abuttingly engage the structure or body, effectively shielding the structure or body from the direct outward deployment of the air bag.

Figure 25A:
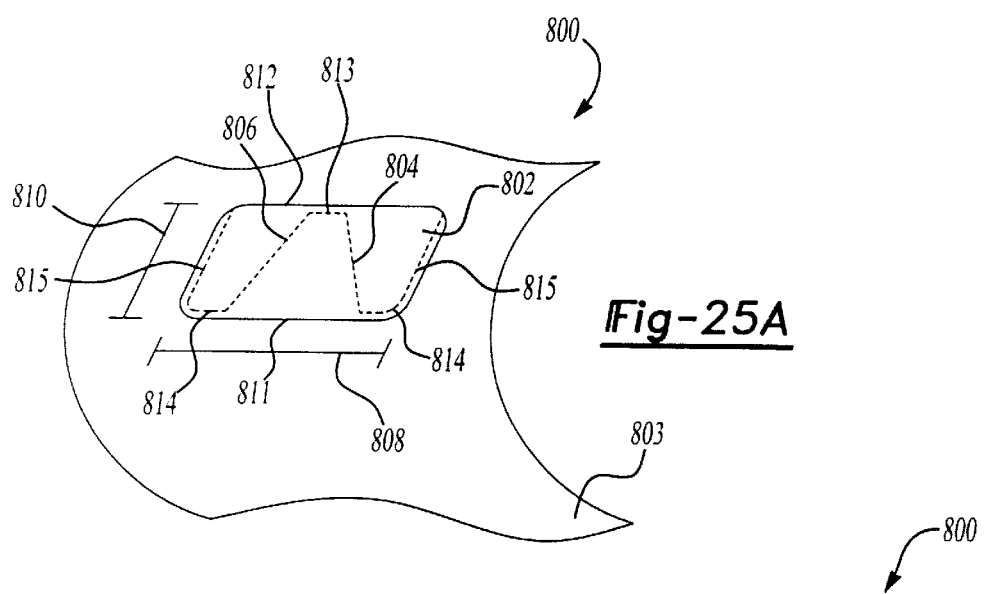
FIGS. 25(a), 25(b) and 25(c) respectively illustrate two perspective and one side view of a sixteenth illustrative air bag system having a deployment door guidance system in accordance with the present invention.
Figure 25B:
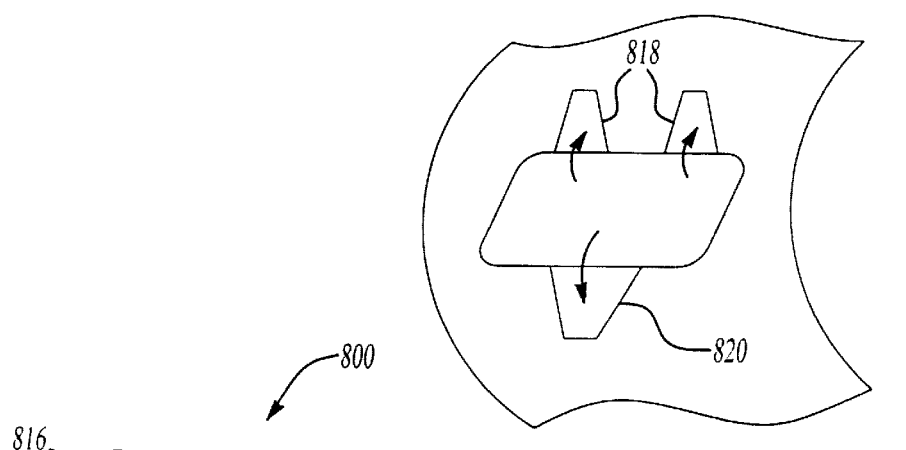

Referring to FIGS. 25(*a*)–25(*c*), there is illustrated an air bag system 800 having a deployment door 802 disposed within a dashboard 803 of an automotive vehicle (not shown). The deployment door 802 includes a first seam 804 and a second seam 806 disposed within or upon the door 802. The door 802 is generally rectangular and has a length 808 and a width 810. The seams 804, 806 extend at an angle across the width 810 such that the seams 804, 806 get closer to each other as they extend from a lower lengthwise edge 811 to an upper lengthwise edge 812. The door 802 further includes a seam 813 that extends along the length 808 of the door 802 adjacent the upper lengthwise edge 812 to interconnect ends of the seams 804, 806 extending across the width 810 and a pair of seams 814 that extend from the lower sides of the door 802 to the other end of the seams 804, 806 extending across the width 810, and a pair of seams 815 that extend along the width 810 adjacent the sides of the door 802.

The seams 804, 806, 813, 814, 815 may be formed in a variety of manners, including but not limited to, perforating the seams 804, 806, 813, 814, 815 into a portion of the door 802, or otherwise creasing or thinning portion of the door 802 to form a reduced section or other structure capable of rupturing from the pressure of the gas upon deployment of the air bag. Without limitation, the seams 804, 806, 813, 814, 815 may be laser cut into the door 802, cut into the door 802 with heat knives or other suitable mechanical device.

In operation, an air bag 816 is deployed through the door 802 and the door 802 tears along the seams 804, 806, 813, 814, 815 thereby forming first flaps 818 and a second flap 820 that open about axes that are adjacent edges of the door. The seams 804, 806, 813, 814, 815 may be torn by the pressure of the inflating air bags 816 or by other techniques such as fuse type pyrotechnic devices.

Figure 25C:
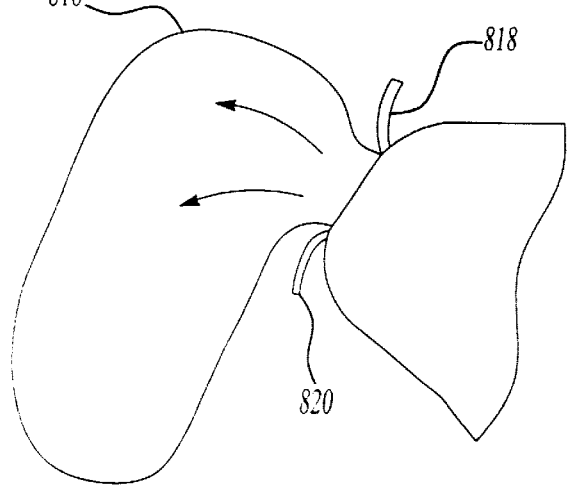
Figure 26A:
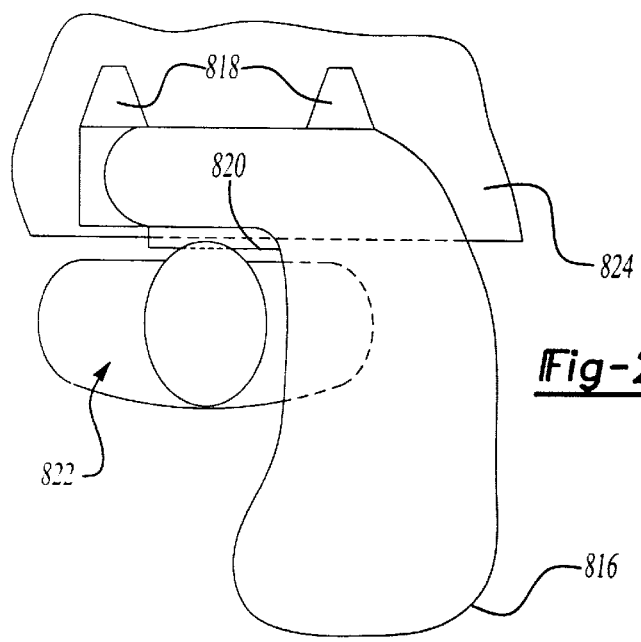
FIGS. 26(a)–26(c) illustrate a first operation of the illustrative deployment door guidance system of FIGS. 25(a)–25(c).
Figure 26B:
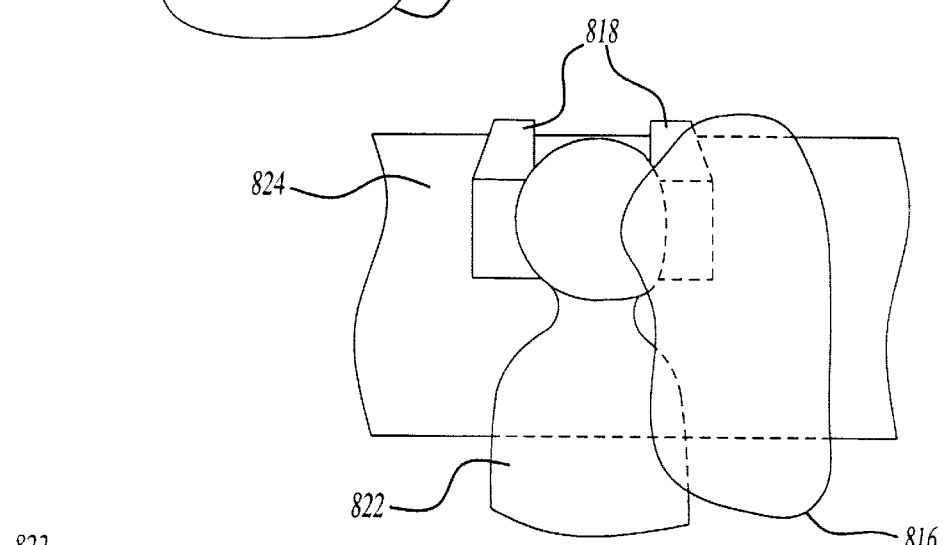
Figure 26C:
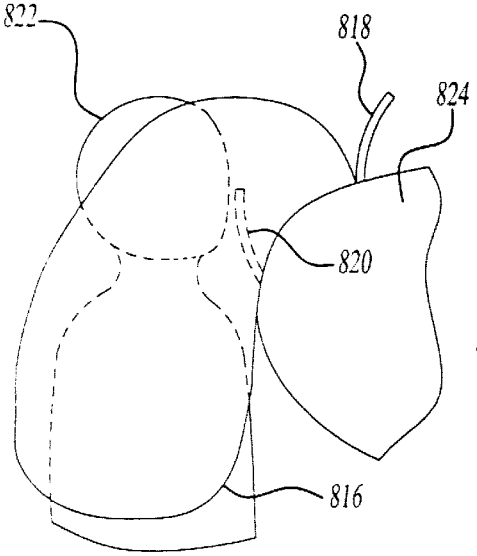

Referring to FIGS. 26(a)–26(c), there is illustrated a passenger 822 who is positioned relatively close to a dashboard 824 of an automotive vehicle. Upon deployment of the air bag 816, the second flap 820 of the door 802 swings open, contacts the individual 822 and helps direct the inflating air bag away from rapidly inflating in the immediate vicinity behind the second flap 820. Effectively, the second flap 820 provides a deflection barrier for a structure that blocks the flap 820 as the flap 820 swings open upon deployment of the air bag 816. Upon blocked deployment, the flap 820 inhibits immediate deployment to the region behind the flap 820 and may assist in directing the bag around the structure (e.g., the individual 822) that blocks the deployment such that the bag 816 deploys to either side of the structure. The first flaps 818 open in an unblocked manner thereby allowing the air bag 816 to move substantially uninhibited toward either side of the flap 820 that blocks deployment. If the flap 820 swings open and is not blocked, then the flap 820 will not deflect the bag 816 and the bag 816 will be free to deploy as designed as shown in FIG. 25(c).

Figure 27A:
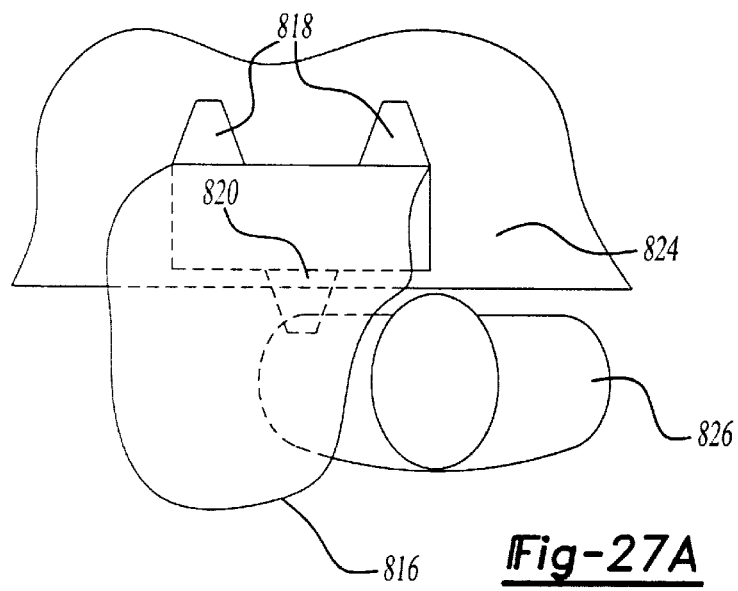
FIGS. 27(a)–27(b) illustrate a second operation of the illustrative deployment door guidance system of FIGS. 25(a)–25(c).
Figure 27B:
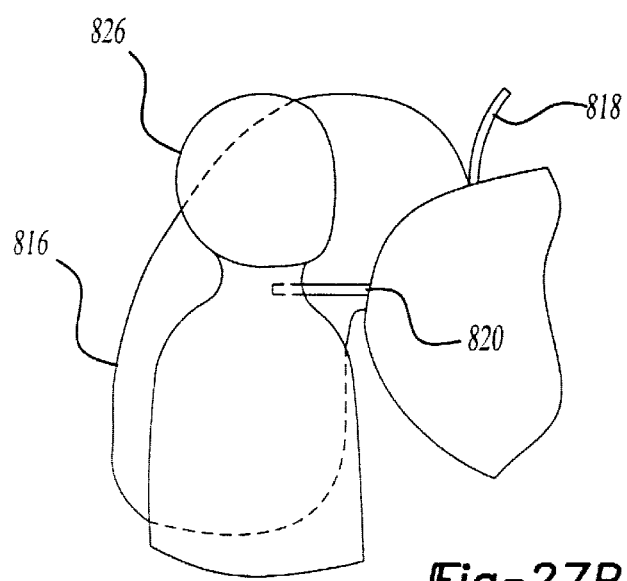

Referring to FIGS. 27(a)–27(b), there is illustrated an individual 826 who is both relatively close to the dashboard 824 and laterally off-center with respect to the air bag 816. Again, upon deployment of the air bag 816, the second flap 820 of the door 802 may contact the individual 826 and may assist in directing the bag around the individual 826 to the opposite side of the individual 826.

It will be appreciated that one of a number of benefits may result from the operation of door flaps in accordance with the present invention. For instance, the flaps can cause one portion of the air bag to accelerate toward a passenger slower than another. It may also serve as a barrier to deflect the air bag away from the individual. A variety of alternative deployment door guidance system configurations may also be used. Referring to FIGS. 28(a)–28(n), examples of such configurations are shown, which include doors that are substantially similar to the deployment door 802 of FIG. 25(a) with the exception that the seam location may vary although the seams may be formed as previously discussed.

Referring to FIG. 28(a), there is illustrated a deployment door guidance system 840 having a deployment door 842 that includes a seam 844 extending along a length 846 of the door 842 near an upper lengthwise edge 848 of the door 842, a pair of seams 850 extending diagonally across a width 852 of the door 842, and a pair of seams 854 extending partially along the length of the door 842 near a lower lengthwise edge 856 to meet or complement the pair of diagonally extending seams 850. The seams 844, 850, 854 allow the door 842 to open with two flaps 858 to the side and one flap 858 centrally downward.

Referring to FIG. 28(b), there is illustrated a deployment door guidance system 860 that includes a door 862 having a centrally located seam 864 extending at least partially along a length 866 of the door 862, the seam including a first and second end 868. The system 860 further includes four seams 870 that extend from adjacent four corners 872 of the door 862 adjacent or directly to the ends 868 of the centrally located seam 864. The seams 864, 870 allow the door 862 to open into four flaps 874, two that open to the sides, one that opens toward the top and one that opens toward the bottom or centrally downward.

Referring to FIG. 28(c), there is illustrated a deployment door guidance system 880 that includes a deployment door 882 that includes a pair of seams 884 extending diagonally across a width 886 of the door 882 such that the seams 884 get closer to each other as they extend from an upper lengthwise edge 888 of the door 882 to a lower lengthwise edge 890 of the door 882. The door 882 further includes a seam 892 that extends along the length of the door 882 adjacent the upper lengthwise edge 888 to interconnect ends of the diagonally extending seams 884 and a pair of seams 894 that extend from the lower sides of the door 882 to other ends of the diagonally extending seams 884 and a pair of seams 887 that extend along the sides of the door. The seams 884, 892, 887, 894 allow the door 882 to open into three flaps 898, two that open to the top sides and one that opens toward the bottom middle.

Referring to FIG. 28(d), there is illustrated a deployment door guidance system 900 having a door 902 that includes a pair of seams 904 that extend generally parallel to each other across a width 906 of the door 902, a seam 907 that extends along the length of the door 902 adjacent an upper lengthwise edge 908 of the door 902 to interconnect ends of the parallel seams 904, a pair of seams 910 that extend from the sides of the door 902 along a lower lengthwise edge 912 of the door 902 to other ends of the parallel seams 904 and a pair of seams 909 that extend along the sides of the door. The seams 904, 907, 910, 909 allow the door to open into two upper flaps 914 and one lower flap 916.

Referring to FIG. 28(e), there is illustrated a deployment door guidance system 920 having a door 922 that includes a diagonally extending seam 924 extending generally centrally across a width 926 of the door 922. The door 922 further includes a seam 927 that extends along a length 928 of the door 922 adjacent an upper lengthwise edge 930 of the door 922 to meet one end of the diagonal seam 924 and a seam 932 that extends along the length 928 of the door 922 adjacent a lower lengthwise edge 934 to meet the other end of the diagonal seam 924. A pair of seams 933 also extend along the side edges of the door 922. The seams 924, 927, 932, 933 allow the door 922 to open into an upper and lower flap 936.

Referring to FIG. 28(f), there is illustrated a deployment door guidance system 940 having a deployment door 942 that includes a seam 944 extending generally centrally and directly across a width 946 of the door 942. The door 942 further includes a seam 947 that extends along a length 948 of the door 942 adjacent an upper lengthwise edge 950 of the door 942 to meet one end of the central seam 944 and a seam 952 that extends along the length 948 of the door 942 adjacent a lower lengthwise edge 954 to meet the other end of the central seam 944. A pair of seams 955 also extends along the side edges of the door 942. The seams 944, 947, 952, 955 allow the door 942 to open into an upper and lower flap 956.

Referring to FIG. 28(g) there is illustrated a deployment door guidance system 960 having a door 962 that includes a diagonally extending seam 964 extending generally centrally across a width 966 of the door 962. The door 962 further includes a seam 967 that extends along a length 968 of the door 962 adjacent an upper lengthwise edge 970 of the door 962 to meet one end of the diagonal seam 964 and a seam 972 that extends along the length 968 of the door 962 adjacent a lower lengthwise edge 974 to meet the other end of the diagonal seam 964. A pair of seams 977 also extends along the side edges of the door 962. The seams 964, 967, 972, 977 allow the door 962 to open into an upper and lower flap 976.

Referring to FIG. 28(h) there is illustrated a deployment door guidance system 980 having a deployment door 982 that includes a seam 984 extending centrally and diagonally across a width 986 of the door 982 and a seam 988 extending across the width 986 of the door 982 adjacent a side edge 990 of the door 982. The door 982 further includes a seam 991 extending along a length 992 of the door 982 adjacent an entire upper lengthwise edge 994 of the door 982 and a seam 996 extending along the length 992 of the door 982 adjacent a lower lengthwise edge 995 of the door 982 to meet an end of the diagonally extending seam 984. The seams 984, 988, 991, 996 allow the door 982 to open into a lower flap 998 and a side flap 999.

Referring to FIG. 28(i) there is illustrated a deployment door guidance system 1000 having a deployment door 1002 that includes a pair of seams 1004 extending diagonally across the door 1002 in a "criss-cross" fashion. The seams 1004 allow the door 1002 to open into an upper, a lower and two side flaps 1006.

Referring to FIG. 28(j) there is illustrated a deployment door guidance system 1020 that includes a deployment door 1022 that includes a pair of seams 1024 that extend diagonally across a width 1026 of the door 1022 and a seam 1028 extending across the width 1026 of the door 1022 adjacent a side edge 1030 of the door 1022. Furthermore, the door 1022 includes a seam 1032 extending along a length 1034 of the door 1022 adjacent an upper lengthwise edge 1035 of the door 1022 from one side of the door 1022 to one end of each of the diagonal seams 1024 and a pair of seams 1036 extending along a lower lengthwise edge 1038 of the door 1022 from opposing sides of the door 1022 to ends of the diagonal seams 1024. The seams 1024, 1028, 1032, 1036 allow the door 1022 to open into a side, an upper and a lower flap 1039.

Referring to FIG. 28(k), there is illustrated a deployment door guidance system 1040 having a deployment door 1042 that includes a pair of seams 1044 extending adjacent to side edges 1046 of door 1042. The door 1042 further includes a pair of seams 1048 that extend away from a lengthwise edge 1050 of the door 1042 in at least two directions and extend to ends of the seams 1044. Furthermore, the door 1042 includes a seam 1051 extending along the lengthwise edge 1050 connecting ends of the seams 1048. The seams 1044, 1050 allow the door 1042 to open into two upper and one lower flap 1052.

Referring to FIG. 28(l), there is illustrated a deployment door guidance system 1060 having a deployment door 1062 that includes a pair of seams 1064 extending adjacent to side edges 1066 of door 1062 and a seam 1068 that extends away from a lengthwise edge 1070 of the door 1062 in at least two directions and extends to an end of one of the seams 1064 adjacent a side edge 1066 of the door 1062. The door 1062 further includes a seam 1072 that extends adjacent the upper lengthwise edge 1070 of the door 1062 between an end of the bi-directional seam 1068 and to an end of one of the seams 1064 adjacent a side edge 1066 of the door 1062. The seams 1064, 1068, 1072 allow the door 1062 to open into an upper and a lower flap 1078.

Referring to FIG. 28(m), there is illustrated a deployment door guidance system 1080 having a deployment door 1082 that includes a seam 1084 extending across a length 1086 of the door 1082 and seams 1085 extending along the side edges of the door 1082. The seams 1084, 1085 allow the door 1082 to open into an upper and a lower flap 1088.

Referring to FIG. 28(n), there is illustrated a deployment door guidance system 1100 having a deployment door 1102 that includes a seam 1104 extending across a length 1106 of the door 1102 and a seam 1108 extending across a portion of a width 1110 of the door 1102 and a seam 1107 extending adjacent to an upper lengthwise edge 1109 of the door 1102. The seams 1104, 1107, 1108 allow the door 1102 to open into two side flaps 1118 and a lower flap 1118.

The deployment door guidance system may also include a deployment door having a flap with an air bag deflector. The air bag deflector will be located upon a surface that opposes an air bag of an air bag system such that the air bag at least partially pushes upon the air bag deflector to open the deployment door. If the flap is blocked by an object upon deployment of the air bag as the flap swings open, the air bag deflector may act to reduce the force exerted upon the object by providing one or more guide surfaces to direct the air bag away from the object. Furthermore, the air bag deflector may assist in guiding the air bag around the object that blocks deployment whether or not the air bag deflector is made of a softer or harder material than the flap of the door. Generally, the air bag deflector will guide the air bag by providing one or more surfaces that are slanted or curved to promote movement of the air bag around the flap and the air bag deflector. Air bag deflectors for door flaps may be formed from a variety of material that include, but are not limited to, plastics, polymers, elastomers, foams or combinations thereof.

Figure 30A:
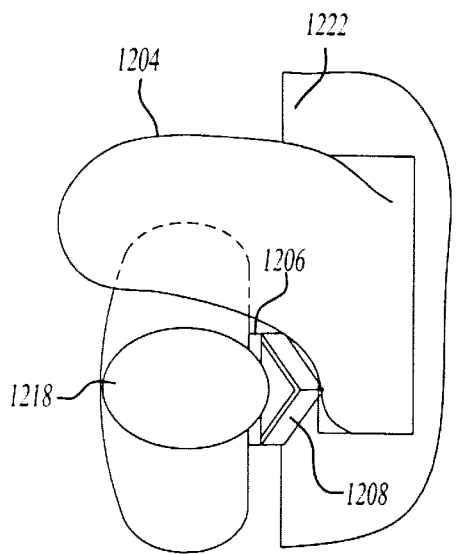
FIGS. 30(a)–30(b) illustrate the operation of the deployment door flap system of FIGS. 29(a)–29(c).
Figure 30B:
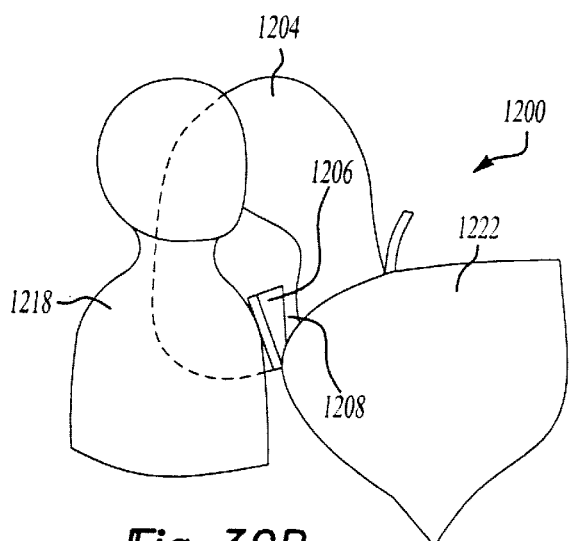

Referring to FIGS. 29(a), 30(a), 30(b), there is illustrated a deployment door guidance system 1200 that includes a deployment door and an air bag 1204 wherein the deployment door opens into at least one door flap 1206 and the door flap 1206 includes an air bag deflector 1208. The air bag deflector 1208 is attached (e.g., mechanically or adhesively secured) to a side of the door flap 1206 that faces or is directed toward the air bag 1204 and the air bag deflector 1208 extends outwardly from the side of the door flap 1206 toward the air bag 1204 to form a generally triangular cross-section 1210 with a leading edge 1212 of the triangular cross-section 1210 separating two sides 1214, 1216 of the air bag deflector 1208 that are angled with respect to the surface of the flap 1206 from which the air bag deflector 1208 extends. Optionally, the air bag deflector 1208 may extend further away from the flap 1206 at portions of the air bag deflector 1208 or may extend equidistantly. In operation, the air bag 1204 pushes against the leading edge 1212 of the air bag deflector 1208, and if the air bag 1204 meets with resistance from the air bag deflector 1208 which may be caused by a blocked deployment, the air bag 1204 tends to move to one of the sides 1214, 1216 of the air bag deflector 1208 and away from the leading edge 1212.

One example of such a situation is if the lower flap 1206 of the deployment door is inhibited in its deployment by an out of position individual 1218. Referring again to FIGS. 30(a)–30(b), an individual 1218 is shown who is relatively close to a dashboard 1222 of a vehicle (not shown) having the deployment door guidance system 1200 of FIG. 29(a). Upon deployment of the air bag 1204, the lower flap 1206 contacts the individual 1218 and the air bag deflector 1208 assists in directing the air bag 1202 away from and/or around the flap 1206 and around the individual 1218.

Alternative embodiments of door flap air bag deflectors 1230, 1240 are shown in FIGS. 29(b), 29(c). The air bag deflector 1230 of FIG. 29(b) is generally triangular in cross-section with a leading edge 1232 that separates a first and second planar surface 1234, 1236 wherein the first surface 1234 is generally perpendicular to the body of a flap 1238 from which the air bag deflector 1230 extends while the second surface 1236 is generally angled with respect to the body of the flap 1238.

The air bag deflector 1240 of FIG. 29(c) is elongated and extends in a curved or arcuate manner along a surface 1242 of a deployment door flap 1244.

It shall be appreciated that certain air bags reside behind doors that are not part of a dashboard. In those, embodiments it will be possible to form configurations of flaps similar to those shown with materials mounted adjacent the air bag.

A Material Flap Guidance System

The air bag system may optionally include a material flap guidance system that includes a material flap positioned to guide the deployment of an air bag of the air bag system. The material flap (with or without suitable stiffening members) may be positioned to cover the air bag prior to deployment of the air bag such that when the air bag is deployed, the air bag pushes the material flap outward toward a seat or seating position into which the air bag is being deployed. If the flap contacts an object before the air bag is fully or substantially deployed, the material flap will brace against the object and serve to deflect the deploying air bag around the object. The material flap thus functions similarly to the door guidance system discussed above, except that the flap constitutes an additional structural member relative to the door flaps.

Figure 31A:
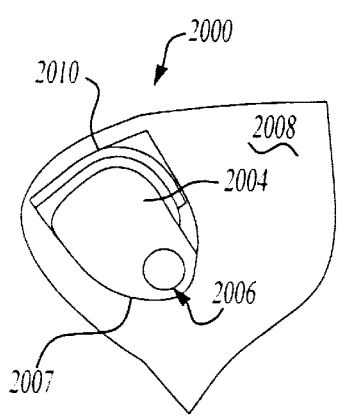
FIGS. 31(a)–31(b) illustrate an air bag system having a material flap guidance system in connection with a seventeenth illustrative air bag system.
Figure 31B:
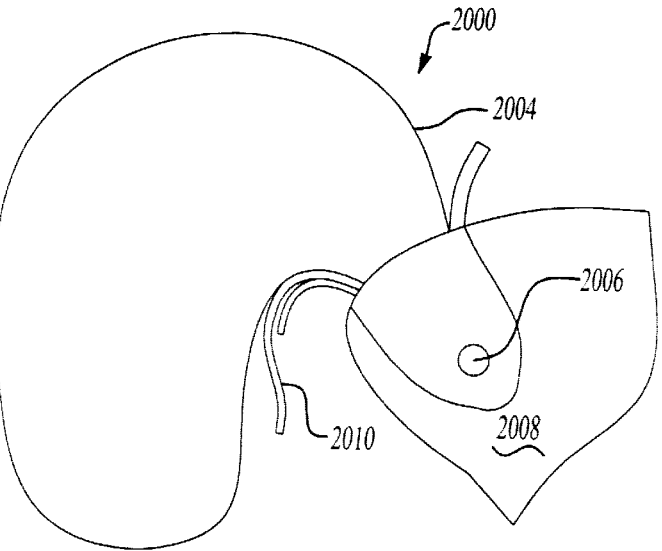
Figure 32A:
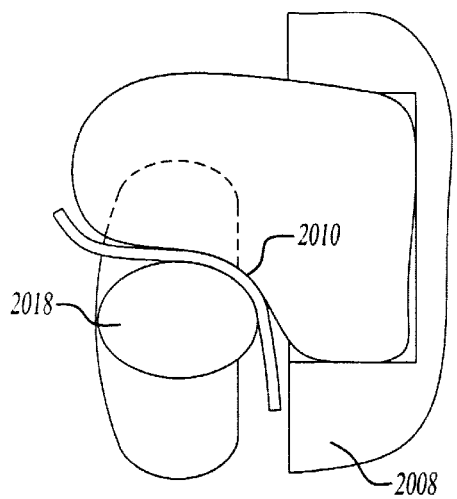
FIGS. 32(a)–32(d) illustrate the operation of the illustrative material flap guidance system of FIGS. 31(a)–31(b).
Figure 32B:
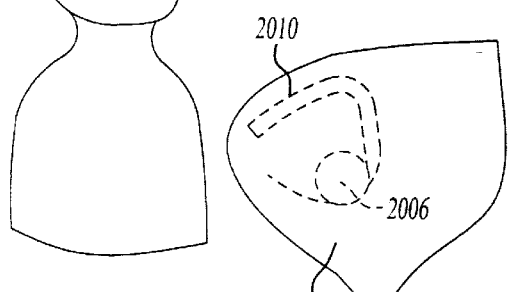
Figure 32C:
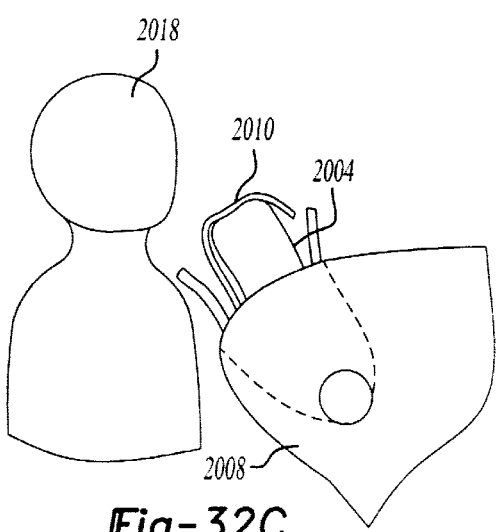
Figure 32D:
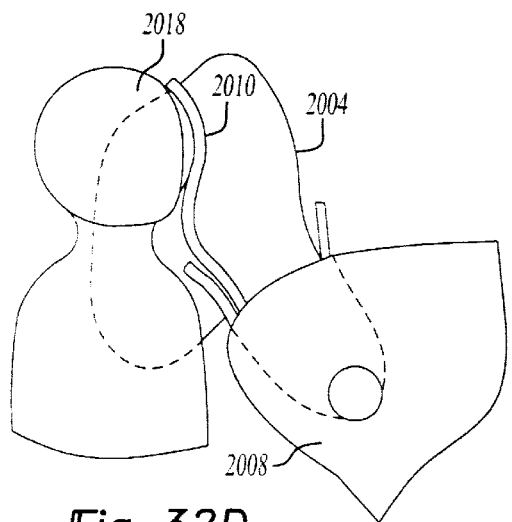

Referring to FIGS. 31(a)–31(b), an air bag system 2000 includes an air bag 2004 and an inflator 2006 disposed within a housing 2007 that is in a dashboard 2008. A material flap 2010 at least partially covers the air bag 2004 when the air bag is in a packed or non-deployed state within the dashboard 2008. As shown, the flap 2010 is attached to a portion of the dashboard 2008 or housing 2007 and is draped over the packed air bag 2004. In alternative embodiments, however, the flap 2010 may be attached to other suitable portions of a vehicle.

In operation, the flap 2010 leads or is pushed by the air bag 2004 out of the dashboard 2008 upon deployment. If the deployment of the bag 2004 is unblocked as shown in FIG. 31(b), the flap 2010 may fall below the air bag 2004 as the bag 2004 deploys in a conventional manner. However, if the deployment of the bag 2004 is blocked as shown in FIGS. 32(a)–32(d), the flap 2010 may contact any object (e.g., an individual) 2018 that blocks the deployment such that the flap 2010 can assist in guiding the air bag 2004 around the object 2018.

Material flaps may be formed of a variety of materials which include, but are not limited to, nylon materials, polyester material or other suitable materials.

In alternative embodiments of the invention, a flap of a material flap guidance system may include a strength or stiffening element that makes a portion of the flap more resistant to flex or bend. The stiffening element may be made of additional flap material, a polymer, elastomer, plastic, foam or other suitable material that is adhesively secured or sewn into or otherwise attached to the flap.

Figure 33:
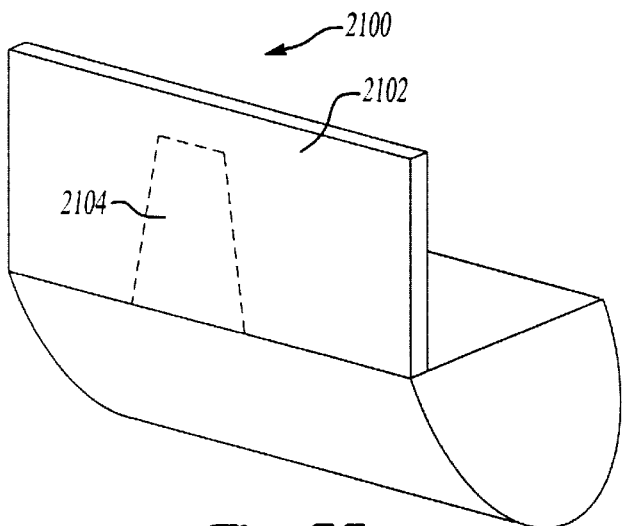
FIG. 33 illustrates a variation of the illustrative material flap guidance system having a flap with a stiffening element.

Referring to FIG. 33, there is illustrated a material flap guidance system 2100 having a material flap 2102 and a stiffening element 2104 extending at least partially across a portion of the flap 2102. In the embodiment shown, the stiffening element 2104 is generally centrally located upon the flap 2102 although other locations are possible.

Figure 34:
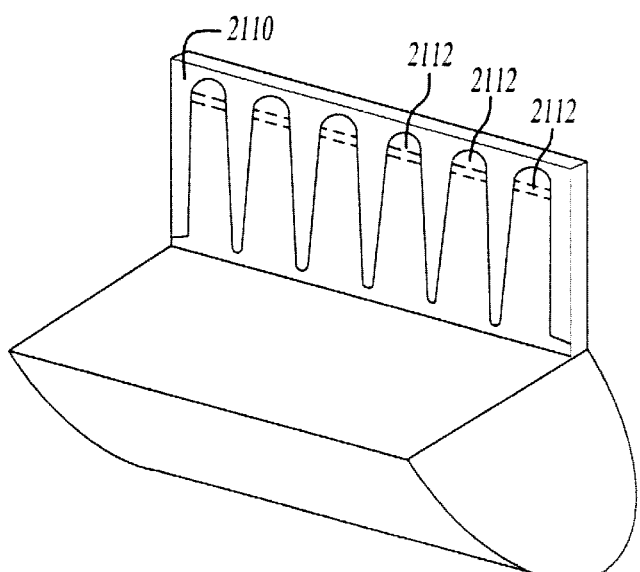
FIG. 34 illustrates another variation of the illustrative material flap guidance system having a flap with multiple stiffening elements.
Figure 35A:
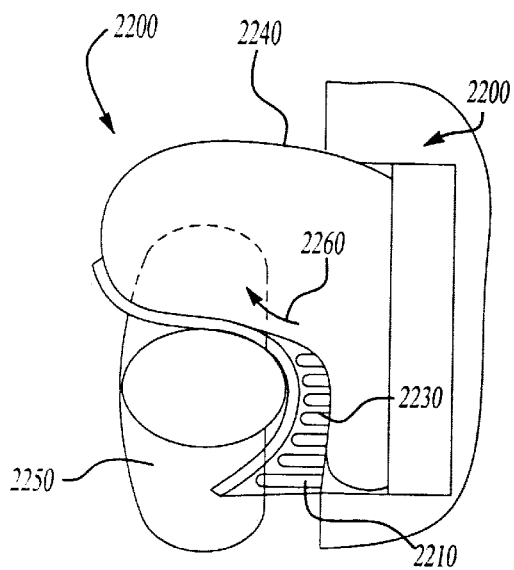
FIGS. 35(a)–35(f) illustrate the operation of the illustrative material flap system of FIG. 34.
Figure 35B:
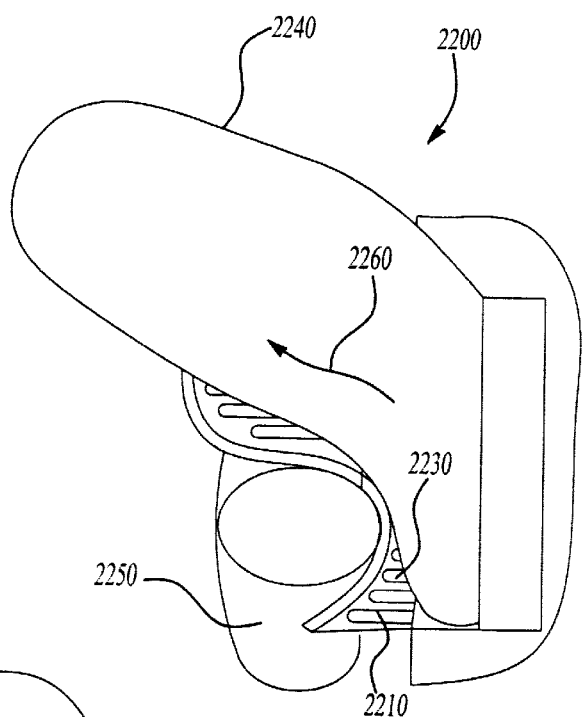
Figure 35C:
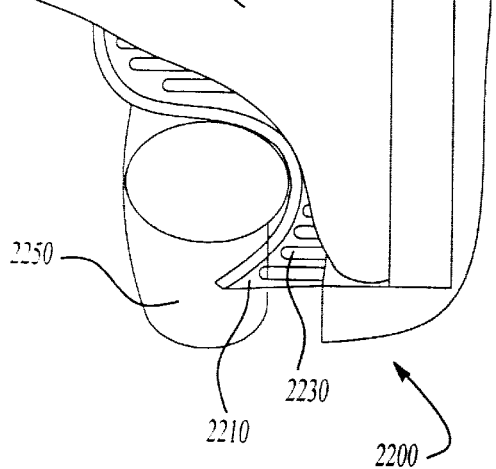
Figure 35D:
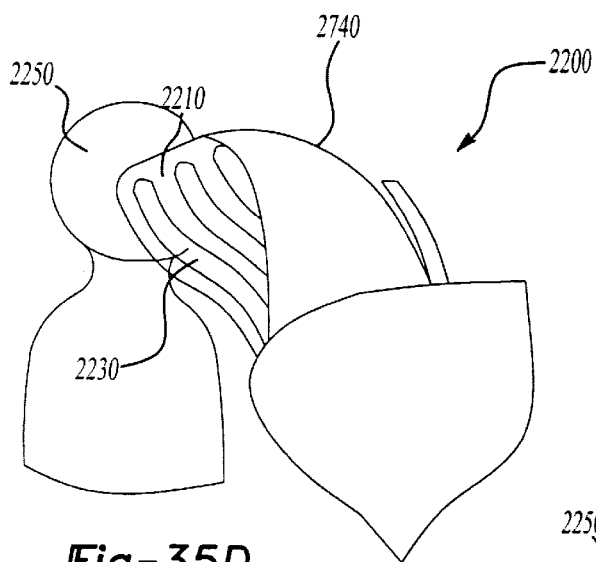
Figure 35E:
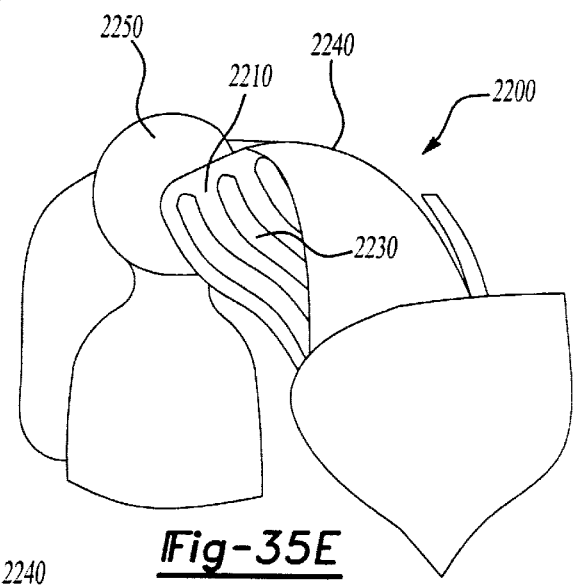
Figure 35F:
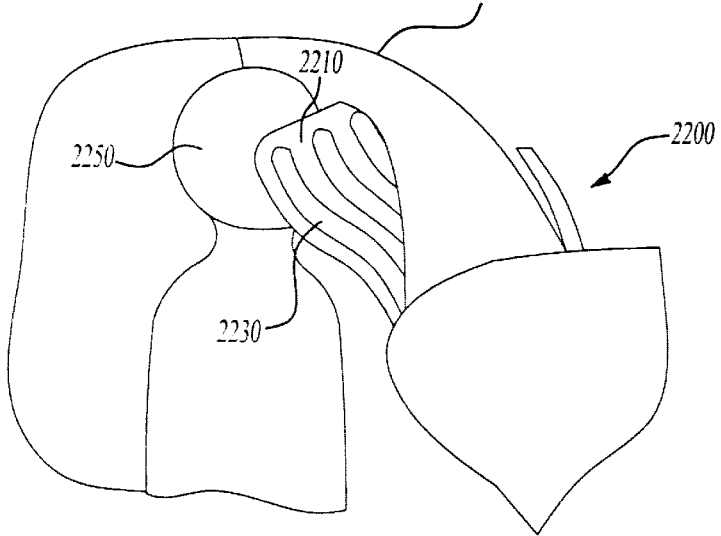

In alternative embodiments, and referring to FIG. 34, a material flap 2110 may have multiple stiffening elements 2112 arranged upon the flap 2110.

In operation, the stiffening elements can assist in guiding an air bag around an out of position individual who is relatively close to a dashboard of an automotive vehicle. Referring to FIGS. 35(a)–35(f), there is illustrated the operation of an air bag system 2200 having a material flap guidance system that includes a material flap 2210 with multiple stiffening elements 2230 that assist in guiding an air bag 2240 around an individual 2250. As can be seen, the stiffening elements 2230 can assist in creating or forming a more direct path 2260 around the individual 2250 for the air bag 2240 to follow as indicated by arrow 2260.

Stiffening elements may come in a variety of configurations and/or cross-sections. One example of a stiffening element 2300 with a generally triangular cross-section is illustrated in FIGS. 36(a)–36(c).

Furthermore, stiffening elements may be formed in a variety of manners and may be attached to material flaps in a variety of manners. In FIG. 37(a), there is illustrated a stiffening element 2310 formed by folding a portion of a material flap 2320 upon itself and securing the folding by sewing. In FIG. 37(b), there is illustrated a stiffening element 2340 sewn to a material flap 2350. In FIG. 37(c), there is illustrated a stiffening element 2360 secured in a pocket 2370 attached to a material flap 2380. In FIG. 37(d), there is illustrated a stiffening element 2386 secured in a pocket 2390 integrally made from a material flap 2400 with an additional overfold 2402 of material.

Figure 38A:
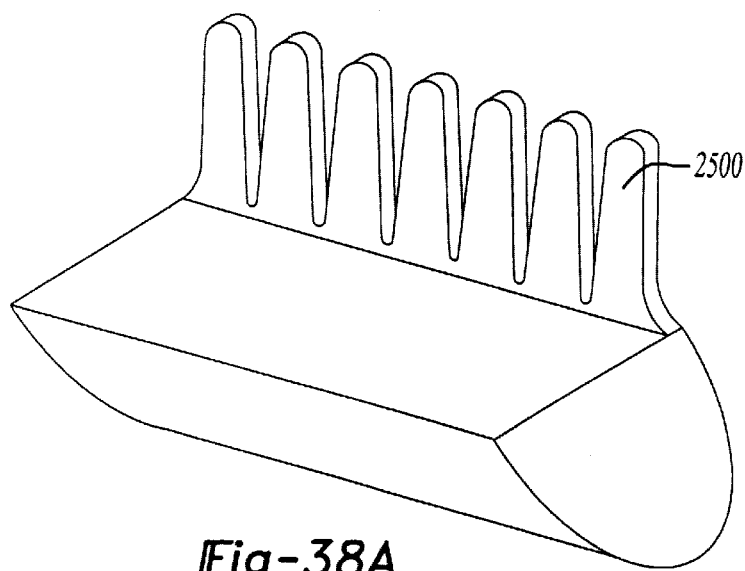
FIGS. 38(a)–38(b) illustrate embodiments of illustrative stiffening elements as material flaps.
Figure 38B:
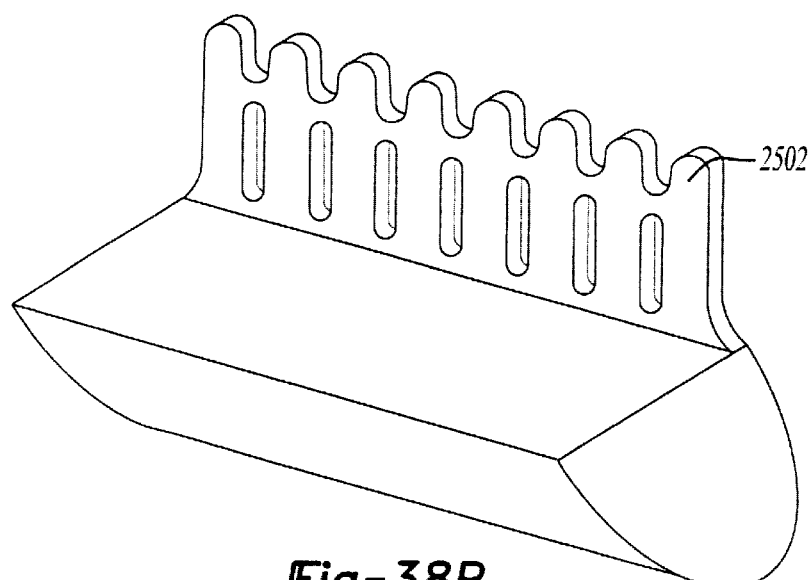

In another embodiment, stiffening elements may be used without a material flap. Such stiffening elements 2500, 2502 are shown in FIGS. 38(a) and 38(b).

The skilled artisan shall appreciate that general elements disclosed for the air bag system of the present invention may be used alone or in combination.

It should be understood that the invention is not limited to the exact embodiment or construction which has been illustrated and described but that various changes may be made without departing from the spirit and the scope of the invention.

What is claimed is:

1. An automotive vehicle air bag system comprising:

an air bag;

an inflator assembly adjacent said air bag for emitting gas into said air bag;

a first baffle secured within said air bag, said baffle dividing said air bag into a first and second compartment, wherein said first compartment receives said gas such that said first compartment substantially inflates prior to substantial inflation of said second compartment for assisting in allowing the air bag to move around an out of position individual that blocks deployment of said air bag;

a flap that is moved toward a seating position for contacting said out of position individual blocking deployment of said air bag and for further assisting in guiding said air bag around said individual;

a gas emission direction system including a rigid gas deflector mounted adjacent said inflator assembly and having one or more walls for directing gas emitted from said inflator assembly toward an opening defined within said deflector; and a generally tubular elongated flexible gas deflector attached to said rigid gas deflector for receiving gas from the opening of the rigid deflector, said rigid deflector directing gas toward an opening within said flexible deflector, said flexible deflector opening generally located within said first compartment of said air bag.

2. An air bag system as in claim 1, wherein said flap is part of a material flap guidance system wherein said flap is a relatively flexible material draped over said air bag prior to deployment of said air bag such that said air bag moves said flap toward said seating position upon deployment of said air bag.

3. An air bag system as in claim 1, wherein said rigid deflector comprises a first wall, a second wall opposing the first wall and an arcuate side wall adjoining said first and second walls for guiding air in a predetermined direction.

4. An air bag system as in claim 1, further comprising:

a housing for at least partially surrounding said air bag prior to inflation of said air bag wherein said baffle extends from adjacent said housing to an inner surface of said air bag upon inflation of said air bag; and a releasable device for selectively releasing said baffle thereby assisting in controlling a degree of release of said air bag;

wherein said one or more walls of said rigid deflector includes a first wall, a second wall opposing the first wall and an arcuate side wall adjoining said first and second walls for guiding air in a predetermined direction.

5. An air bag system comprising:

an air bag;

an inflator assembly adjacent said air bag for emitting gas into said air bag; and a first baffle secured within said air bag, said baffle dividing said air bag into a first and second compartment, wherein:

i) said first compartment receives said gas such that said first compartment substantially inflates prior to substantial inflation of said second compartment for assisting in allowing said air bag to move around an object that blocks deployment of said air bag;

ii) said baffle, upon inflation, has an inverted U-shape in cross-section such that openings are defined in a lower portion of said air bag for allowing said gas to flow from said first compartment to said second compartment; and iii) said baffle substantially defines said first compartment; and a gas emission direction system having a generally tubular elongated flexible gas deflector with an opening located within said first compartment of said air bag.

6. An air bag system as in claim 5, further comprising a housing for at least partially surrounding said air bag prior to inflation of said air bag wherein said baffle extends from adjacent said housing to an inner surface of said air bag upon inflation of said air bag.

7. An air bag system as in claim 5, further comprising a releasable device for selectively releasing said baffle thereby assisting in controlling a degree of release of said air bag.

8. An air bag system as in claim 5, further comprising a rigid deflector adjacent said inflator assembly and having a first wall, a second wall opposing the first wall and an arcuate side wall adjoining said first and second walls for guiding air in a predetermined direction.

9. An air bag system as in claim 5, further comprising:

a housing for at least partially surrounding said air bag prior to inflation of said air bag wherein said baffle extends from adjacent said housing to an inner surface of said air bag upon inflation of said air bag;

a releasable device for selectively releasing said baffle thereby assisting in controlling a degree of release of said air bag; and a rigid deflector adjacent said inflator assembly and having a first wall, a second wall opposing the first wall and an arcuate side wall adjoining said first and second walls for guiding air in a predetermined direction.

10. An automotive vehicle air bag system comprising:

an air bag;

an inflator assembly adjacent said air bag for emitting gas into said air bag;

a first baffle secured within said air bag, said baffle dividing said air bag into a first and second compartment, wherein:

i) said first compartment receives said gas such that said first compartment substantially inflates prior to substantial inflation of said second compartment for assisting in allowing the air bag to move around an object that blocks deployment of said air bag;

ii) said baffle, upon inflation, has an inverted U-shape in cross-section such that openings in a lower portion of said air bag for allowing said gas to flow from the first compartment to the second compartment; and iii) said baffle substantially defines the first compartment; and a gas emission direction system including a rigid gas deflector mounted adjacent said inflator assembly and having one or more walls for directing gas emitted from said inflator assembly toward an opening defined within said deflector; and a generally tubular elongated flexible gas deflector attached to said rigid gas deflector for receiving gas from the opening of the rigid deflector, said rigid deflector directing gas toward an opening within said flexible deflector, said flexible deflector opening generally located within said first air bag; and a flap that is moved toward a position for contacting said out of position individual blocking deployment of said air bag and for further assisting in guiding said air bag around said individual.

11. An air bag system as in claim 10, wherein said flap is part of a material flap guidance system wherein said flap is a relatively flexible material draped over said air bag prior to deployment of said air bag such that said air bag moves said flap toward said seating position upon deployment of said air bag.

12. An air bag system as in claim 11, further comprising a housing for at least partially surrounding said air bag prior to inflation of said air bag wherein said baffle extends from adjacent said housing to an inner surface of said air bag upon inflation of said air bag.

13. An air bag as in claim 12, further comprising a releasable device for selectively releasing said baffle thereby assisting in controlling a degree of release of said air bag.

14. An air bag system as in claim 10, further comprising a rigid deflector adjacent said inflator assembly and having a first wall, a second wall opposing the first wall and an arcuate side wall adjoining said first and second walls for guiding air in a predetermined direction.

* * * * *